(12) United States Patent
Accarie et al.

(10) Patent No.: US 7,676,824 B2
(45) Date of Patent: Mar. 9, 2010

(54) METHOD FOR THE PROCESSING OF REMOTE CONTROL SIGNALS WITHIN A HOME AUDIOVISUAL NETWORK, CORRESPONDING SIGNAL, DEVICES AND COMPUTER PROGRAM

(75) Inventors: Jean-Paul Accarie, Vern-sur-Seiche (FR); Yacine El Kolli, Rennes (FR)

(73) Assignee: Canon Europa NV, Amstelveen (NL)

( * ) Notice: Subject to any disclaimer, the term of this patent is extended or adjusted under 35 U.S.C. 154(b) by 1879 days.

(21) Appl. No.: 10/209,679

(22) Filed: Aug. 1, 2002

(65) Prior Publication Data

US 2003/0048757 A1    Mar. 13, 2003

(30) Foreign Application Priority Data

| Aug. 1, 2001 | (FR) | ................................... 01 10355 |
| Aug. 1, 2001 | (FR) | ................................... 01 10366 |
| Aug. 1, 2001 | (FR) | ................................... 01 10367 |

(51) Int. Cl.
    *H04N 7/18* (2006.01)
(52) U.S. Cl. .............................. 725/81; 725/78; 725/80
(58) Field of Classification Search ............. 725/74–85, 725/141, 139; 370/257; 710/8; 348/734
    See application file for complete search history.

(56) References Cited

U.S. PATENT DOCUMENTS 5,081,534 A * 1/1992 Geiger et al. ............... 348/734

(Continued)

FOREIGN PATENT DOCUMENTS

| EP | 0 435 370 A2 | 7/1991 |
| EP | 0 727 880 A2 | 8/1996 |
| EP | 1 039 725 A2 | 9/2000 |
| WO | WO 00/58925 | 10/2000 |

OTHER PUBLICATIONS

IEEE Standard for a High Performance Serial Bus, 1995 Section 6. Link Layer Specification.*

*Primary Examiner*—Ngoc K. Vu
(74) *Attorney, Agent, or Firm*—Fitzpatrick, Cella, Harper & Scinto

(57) ABSTRACT

Processing signals from a remote control device within a home audiovisual network comprising a plurality of nodes for interconnecting a plurality of terminals, wherein, within the network, at least two types of remote-control signals are used, including first type remote-control signals specific to the nodes and sent by at least one first remote control device associated with the nodes, and second type remote-control signals specific to the terminals and sent by at least one second remote control device associated with at least one of said terminals. Each node of the network, called a local node, when receiving a first remote-control signal, performs analysis of the type of the received first remote-control signal, if the type of the received first remote-control signal is determined to be one of the first type remote-control signals, processing the signal and performing at least one function in response to the received first remote-control signal, if the type of the received first remote-control signal is determined to be one of the second type remote-control signals, transparently sending said received second type remote-control signal to a target node if the target node, to which a target terminal is connected, has been determined beforehand, said target terminal being connected with said target node, through at least one predetermined link between the target node and the target terminal, and if no target node has been determined beforehand, ignoring said received second type remote-control signal.

46 Claims, 12 Drawing Sheets

U.S. PATENT DOCUMENTS

| | | | |
|---|---|---|---|
| 6,026,150 A | 2/2000 | Frank et al. | 379/90.01 |
| 6,160,796 A * | 12/2000 | Zou | 370/257 |
| 6,192,399 B1 | 2/2001 | Goodman | 709/217 |
| 6,639,914 B1 * | 10/2003 | Choi et al. | 370/389 |
| 7,194,755 B1 * | 3/2007 | Nakata et al. | 725/78 |
| 2005/0285750 A1 * | 12/2005 | Hayes et al. | 340/825.72 |

* cited by examiner

| Address1394 (bus_id, node_id) | Unique logical Id | Unique network Id | Routing information |
|---|---|---|---|
| | | | |
| | | | |
| | | | |

FIGURE 9

METHOD FOR THE PROCESSING OF REMOTE CONTROL SIGNALS WITHIN A HOME AUDIOVISUAL NETWORK, CORRESPONDING SIGNAL, DEVICES AND COMPUTER PROGRAM

BACKGROUND OF THE INVENTION

The field of the invention is that of home audiovisual networks of the type used to interconnect a plurality of audio and/or video analog and/or digital type terminals (also called devices) so that they can exchange audiovisual signals.

These terminals for example are included among the following list of equipment (which is not exhaustive): television receivers (using satellite, RF channels, cable, xDSL and other means), television sets, video tape recorders, scanners, digital camcorders, digital cameras, DVD readers, computers, personal digital assistants (PDAs), printers, etc.

The home audiovisual network is for example of the high bit rate switched type comprising a certain number of nodes, used especially for the real-time exchange of moving pictures for distribution within a dwelling.

A home audiovisual network according to the invention comprises a plurality of nodes connected by a plurality of physical communication links. These links are for example the type used for two-way data transfers according to the IEEE 1355 standard.

It may be recalled that the IEEE 1355 standard is defined by the IEEE 1355-1995 Standard for Heterogeneous InterConnect (HIC) (low cost low latency scalable serial interconnect) (also known as ISO/IEC 14575 DIS).

Audio and/or video terminals communicate with one another through the nodes to which they are connected. The nodes that form the skeleton of the network comprise especially:

- first interface means enabling the connection, through one or more links (for example according to the IEEE 1355 standard), of one or more other nodes;
- second interface means used for the connection of one or more analog terminals (namely terminals capable of receiving audiovisual signals in analog form);
- third interface means used for the connection (for example through a digital bus according to the IEEE 1394 standard) of one or more digital terminals (namely terminals capable of receiving audiovisual signals in digital form).

The working of a home audiovisual network of this kind is as follows: a connection is made up, through a plurality of nodes, between a first terminal (or listener) that seeks to receive audiovisual signals and a second terminal (or talker) that can give it these signals.

Some elements of the terminology used hereinafter in the description shall now be specified.

The first terminal mentioned here above is called a destination terminal and the node to which it is connected is called a destination node.

As for the second terminal mentioned here above, two cases may be distinguished.

In a first case, the second terminal is integrated into a node called a "source node". Thus, it is assumed that the source node comprises means for the reception and/or reading of source signals (originating outside the network) and means for the transmission of these source signals, in the form of the above-mentioned audiovisual signals, to the destination node. In other words, the source node receives and/or reads source signals and introduces them into the home audiovisual network in the form of audiovisual signals. In this first case, the (source) node and the second terminal are the same.

In a second case, the second terminal called an "input terminal" is connected to a node called an "input node". Unlike the first case, the (input) node and the second terminal are not the same. The input node does not have means for the reception and/or reading of source signals (originating outside the network). The input node receives audiovisual signals coming from the input terminal and introduces them into the home audiovisual network.

The term "input terminal" is understood to mean for example a digital camcorder, a digital camera, a digital output DVD reader or any analog device seen through an analog/digital converter.

It will be noted that a source node can also play the role of an input node if an input terminal is connected to it.

Conventionally, the analog and/or digital terminals of such networks are associated with control devices, generally of the remote control type, enabling their remote control. Thus, a user for example may check the actions of reading, freeze frames or rewinding of a video tape recorder by means of an infrared remote control with a range of about some meters.

Now, in the context of a home audiovisual network of this kind, it is also necessary to give the user the possibility of controlling a remote terminal (typically located in another room of the house or apartment).

Furthermore, one problem that arises for the user is the ability to manage the nodes of the network by remote control.

The invention therefore relates more specifically to the management, within a home audiovisual network, of the control signals designed for the nodes of the network or the analog or digital terminals with which they are connected as well as their conveyance within the network.

To date, there are several types of home installations or networks implementing systems for the conveyance of infrared control signals.

Thus, the U.S. Pat. No. 6,192,399 describes a UTP (unshielded twisted pair) type of network implementing a video server. According to the technique described in the document, when a user wishes to use the video server, infrared commands are conveyed up to this server. The video server centralizes all the commands flowing on the network and, in response, broadcasts the requested information to all the units of the network. At reception of a data packet, each piece of equipment or node of the network ascertains that the received packet is addressed to it and, if this is the case, analyzes its contents.

One drawback of this prior art technique is that it requires the implementation of a centralized control device (in this case the video server) designed to manage all the control signals conveyed on the network and, in response, to broadcast information packets intended for all the units of the network.

The US Patent document U.S. Pat. No. 6,026,150 presents a home telephone network in which each of the devices of the network is assigned an IP (Internet protocol) address. As here above, infrared signal packets are broadcast to all the units of the network and are filtered at each of these destination devices as a function of the IP address that they contain so that only the device to which the packets are addressed carries out an analysis of their contents.

One resulting drawback of this prior art technique is also a drawback of the technique included in the U.S. Pat. No. 6,192,399, i.e. the control signals and the information packets are broadcast to all the units or nodes of the network, including the nodes that are not concerned by such a signal or such a packet.

A resulting drawback of this prior art technique is that such a broadcast of the signals and packets leads to an unnecessary traffic overload within the communications network and further requires that each of the units of equipment of the network should analyze the signals and packets received in order to select those that are addressed to it.

Besides, the exploitation of a home audiovisual network according to the invention requires that each of the terminals of the network should be capable of being identified uniquely especially so that it can be selected at a distance by a user. In other words, the invention also concerns this novel problem of the identification and remote selection of terminals within a home audiovisual network.

Indeed, it will be understood that it may be particularly advantageous for a user of a home audiovisual network to be able to make a selection, from one room of his dwelling, of a terminal located in a neighboring room for example to send it control signals (on, off, pause, etc.) or in order to set up a connection with this terminal.

Thus, a user may wish for example to select a video tape recorder located in his living room to make a connection between this video tape recorder and the television set in his bedroom.

To do so, it is imperative that the terminal which the user wishes to select should be capable of being identified uniquely within the audiovisual network of his dwelling. It is furthermore necessary that this identification should be permanent in time so that, when choosing a given identifier, a user always selects the same terminal, permanently associated with this identifier.

Now, to date, there is no solution enabling this kind of a unique and permanent identification of the terminals of a home audiovisual network and therefore their remote selection by a user.

If the user wishes, from his bedroom, to control the video tape recorder located in his living room, he must move to the living room or at least move until he is within range of a remote control pack associated with the video tape recorder, something that is impractical.

It should be noted that to resolve the problem of the identification of the nodes of a home audiovisual network, it is possible to envisage implementing a network protocol that gives a permanent numbering for all the nodes of the network. However, a protocol of this kind would be highly complex and would have the drawback firstly of not standing up to a powering-off in the network (for example in the event of a current failure or an updating of the topology of the network) and secondly of requiring the implementation of a specific interface enabling the user to know the numbers assigned by the network to each of the nodes.

Furthermore, a technique of this kind would in no way make it possible to uniquely and permanently identify and therefore select the terminals associated with the nodes identified by means of this method. Indeed, the problem of the identification of the nodes of a home audiovisual network is clearly different from the problem of the identification of the terminals of this network.

The IEEE 1394 standard provides for the assigning, to each of the devices complying with this standard, of a universal identifier called the EUI-64. However, the use of the EUI-64 to identify the pieces of equipment of a home audiovisual network would be particularly painstaking and impractical for a user who would be forced, by means of an appropriate man/machine interface, to introduce the 64 bits constituting the identifier of a piece of equipment so as to be able to select it within the network.

Furthermore, this approach is not suited to the identification of the analog terminals of the network which have no EUI-64 identifiers, and therefore does not resolve the aforesaid problem identified by the inventors (namely, the identification and the remote selection of terminals within a home audiovisual network).

A home audiovisual network generally comprises a large number of terminals and therefore also a large number of associated remote controls. When the user wishes to control a particular terminal, he must therefore make a choice, among all the remote controls that he has available, of the one associated with the terminal to be controlled. This is generally a lengthy and painstaking process. To make the use of the network simpler and more user-friendly, it is therefore necessary to reduce the number of remote controls by which the different devices of the network can be controlled.

With regard to the drawback mentioned here above, namely the large number of remote controls used within the network, it has been planned to introduce a universal remote control pack capable of reproducing the functionalities of a plurality of remote controls associated with distinct terminals. For the remote controls possessing a learning mode, the universal remote control and the remote control packs of a television set or video tape recorder are placed face to face and the different keys of the pack are activated so that the universal remote control receives and store the corresponding control signals. The user who wishes to activate his television set or video tape recorder can then activate keys of the universal remote control associated with the memorized signals and the universal remote control emulates the corresponding functions of the remote control pack of the television set or the video tape recorder.

In the context of the home audiovisual network of the invention, it is possible to envisage the use of a single universal remote control which emulates all the functions of all the remote controls associated with the pieces of equipment of the network. An approach of this kind however has several drawbacks.

First, a universal remote control of this kind should have very great storage capacities owing to the large number of remote controls present in the network and hence a large number of functions to be memorized.

Furthermore, the use of a single remote control may be impractical for a user of the home audiovisual network of the invention who will be forced to move about with the universal remote control whenever he goes from one room to another so that he can always control the equipment in the room in which he is located. Moreover, the implementation of a single universal remote control makes it impossible to have simultaneous use of a network by several users located in distinct rooms of the dwelling.

It may be planned to associate a universal remote control to each room of the dwelling and, in each of these remote controls, to store all the commands associated with all the pieces of equipment of the network so that it is possible to use the universal remote control of one room even when moving a terminal from one room of the house to another. However, an approach of this kind will have the drawback, already mentioned here above, of requiring a large storage capacity in each of the universal remote controls. Furthermore, it would require an implementation of a very lengthy and painstaking learning phase, since the user will necessarily have to memorize, in each of the universal remote controls, the totality of the functions proposed by each of the remote controls associated with the equipment of the network. This will be impractical.

SUMMARY OF THE INVENTION

The invention is designed especially to overcome these drawbacks of the prior art.

More specifically, it is a goal of the invention to provide a technique for the processing of control signals within a home audiovisual network that does not require the implementation of a centralized control device.

Another goal of the invention is to implement a technique of this kind according to which the infrared control signals are not all broadcast towards the totality of the units of equipment of the network.

A consequent goal of the invention is to provide a technique of this kind that does not require the implementation, in the nodes of the network, of means for filtering received packets on the basis of an indication of the node or terminal for which they are intended.

Yet another goal of the invention is to provide a technique of this kind used to control two identical terminals of the network differently.

It is also a goal of the invention to implement a technique of this kind enabling a user to achieve the remote control of a piece of equipment of the network (for example enabling a user, from one room in a dwelling, to control a terminal located in a neighboring room).

Another goal of the invention is to provide a technique of this kind used to make a connection between the remote units of equipment of the network, with a view to an exchange of audiovisual flows.

Another goal of the invention is to provide a technique used for the unique and permanent identification of each of the terminals of a home audiovisual network, especially of the switched type.

It is also a goal of the invention to provide a technique of this kind that enables an identification of the terminals that withstands the powering-off of the network especially in the event of a current failure or an updating of the topology of the network.

A resultant goal of the invention is to implement a technique of this kind by which a user can make a remote selection of a terminal of the network. In particular, a goal of the invention is to enable a user to achieve the remote control of a terminal and set up a connection with a remote terminal of the network.

Yet another goal of the invention is to propose a technique of this kind that is simple and user-friendly in its implementation by a user of the network.

Another goal of the invention is to provide a technique for the management of a control signal of a home audiovisual network enabling firstly the control by a user of a remote terminal (typically located in a neighboring room) and secondly the use of a limited number of remote controls within the network.

Another goal of the invention is to implement a technique of this kind by which it is possible to send control signals to a target terminal from any node of the network.

Yet another goal of the invention is to provide a technique of this kind that can be implemented even in the event of terminals being moved within the home audiovisual network.

It is another goal of the invention to provide a technique of this kind that enables a simple and easy use of the network by a user.

Another goal of the invention is to implement a technique of this kind that withstands possible power cuts in the network, for example in the event of current failures or operations of updating the topology of the network.

Yet another goal of the invention is to provide a technique of this kind that is dynamically open-ended as a function of the needs of the users. In particular, the goal of the invention to implement a technique for the management of control signals that enables the addition, elimination or modification of commands available within the network.

These goals and others that shall appear hereinafter are achieved by means of a method for the processing of remote control signals within a home audiovisual network comprising a plurality of nodes used to interconnect a plurality of terminals. Within the network, at least the following two types of remote control signals are used:—first remote control signals specific to the nodes and sent by at least one first remote control pack associated with the nodes; —second remote control signals specific to the terminals and sent by at least one second remote control pack associated with at least one of said terminals. Each node of the network, called a local node, when receiving a remote control signal, performs the following steps analysis of the type of remote control signal received;
    if the remote control signal received is one of the first remote control signals, the local node processes it and performs at least one predetermined function
    if the remote control signal received is one of the second remote control signals,
        and if a target node, to which a target terminal is connected, has been determined beforehand:
            the local node transparently sends said second remote control signal to the target node;
            and said target node retransmits said second remote control signal to said target terminal; said target terminal being connected with said target node, through at least one predetermined link between the target node and the target terminal;
        and if no target node has been determined beforehand, the local node ignores said second remote control signal.

Thus, the invention relies on a quite novel and inventive approach to the management of control signals within a home audiovisual network. Indeed, the invention relies especially on the introduction, into the network, of two distinct types of signals (some specific to the nodes and the others specific to the terminals), on the analysis, in a local node, of the type of control signal received and on the implementation of a processing that is adapted as a function of the type of signal.

The processing of the control signals is thus done according to a distributed system that is no longer centralized as in the prior art techniques, each of the nodes of the network comprising means for the analysis and processing of the control signals received.

Furthermore, the invention can be used to control the functionalities specific to the nodes of the network by means of a first remote control pack while enabling a user to continue to use a second already-existing remote control pack specific to a terminal of the network (for example the infrared remote control of a television set).

Finally, the invention proposes an innovative approach to the management of the control signals within a network, namely the transparent conveyance of control signals to a target node to which there is connected a terminal to which the remote control signals received are addressed.

In the context of the invention, profitable use is made of the synergy existing between the topology of the network and the conveyance of the infrared commands.

In a particular embodiment of the invention, when the remote control signal received is one of the first remote control signals, the local node awaits the reception and processing of at least one other remote control signal to carry out said at least one predetermined function.

Advantageously, said at least one other remote control signal belongs to the group comprising said first and second remote control signals.

Indeed, in a particular embodiment of the invention, certain signals specific to the nodes of the network convey commands that have to be complemented by additional information so that they can be processed by the local node. Thus, a first remote control signal conveying a command for the selection of a terminal, for example, will be able to be processed by the local node only after reception of an identifier of the terminal to be selected, conveyed for example by a remote control signal of the first type described here above.

According to a first embodiment of the invention, said at least one predetermined link between the target node and the target terminal is a cordless link of the same type as the one existing between said at least one remote control pack and said target terminal, the target node emulating at least one function of said at least one second remote control pack so that it can retransmit said second remote control signal.

For example, the target node comprises one or more infrared transmitters and converts the second digitized remote control signal received from the local node into an infrared signal that it sends to the target terminal. If the target node has several infrared transmitters, the transmitter chosen will preferably be the one pointing towards the target terminal to retransmit the second remote control signal.

According to a second embodiment of the invention, said at least one predetermined link between the target node and the target terminal is borne by the medium that connects the target terminal to the target node, as a medium for connecting the target terminal to the home audiovisual network (namely for example a coaxial cable for analog interfaces or a cable for IEEE 1394 type digital interfaces, etc.).

Advantageously, said target terminal is a digital type of target terminal and said at least one predetermined link between the target node and the target terminal is borne by a digital bus, preferably of the IEEE 1394 type, as a medium for connecting the target terminal to the home audiovisual network.

Thus, if the target terminal is digital, the second remote control signal can be conveyed from the target node to the target terminal through the IEEE 1394 link that joins them.

To implement this variant, provision may be made for translation means, in the target node or in the target terminal, of the second remote control signal. These translation means are used for example to translate the second remote control signal into an audiovisual (AV-C) type of command according to the "Digital Interface Command Set standard—Version 1.0, Sep. 13, 1996".

It is possible of course to envisage combining the above two embodiments within one and the same home audiovisual network by deciding for example that the first embodiment will be implemented for all the analog terminals of the network (which are conventionally associated with a remote control pack and therefore capable of receiving signals conveyed on a cordless link) and that the second embodiment will be implemented for all the digital terminals of the network.

According to an advantageous technique of the invention, between the target node and the target terminal, the second remote control signal is conveyed in at least one first packet comprising:
- a header containing especially a piece of information on the target terminal;
- a data field containing especially at least one part of the second remote control signal.

Thus, the header of the packet comprises for example an identifier of the target terminal or a piece of information for the routing of the packet up to the target terminal and the data field comprises the second remote control signal intended for it.

Preferably, should the local node transparently transmit the second remote control signal to the target node, the second remote control signal is conveyed, between the local node and the target node, in at least one second packet comprising:
- a header containing especially a piece of information on the target node and possibly the target terminal;
- a data field containing especially at least one part of the second remote control signal.

According to a preferred variant of the invention, said first packet and said second packet possess a same structure, so that same packets are used to convey the second remote control signal between the local node and the target node and then between the target node and the target terminal.

Thus, the packets conveyed on the cable for the IEEE 1355 type digital interface connecting the local node to the target node are also conveyed to the target terminal, for example through a cable for digital interfaces of the IEEE 1394 type without their structure being modified.

According to a first advantageous characteristic of the invention, said predetermined function performed by the local node after the processing of a first remote control signal and possibly after the processing of at least one other remote control signal, is a function for the identification of a piece of equipment of said network.

Advantageously, said function for the identification of a piece of equipment of said network allows to assign a unique identifier to a node, called an identified node, to which at least one of said terminals can be connected, and wherein said unique identifier is conveyed by the first remote control signal or possibly said other remote control signal.

The invention proposes an innovative approach according to which the identifiers of the nodes are assigned by a user through a man/machine interface included in the local node (namely the node at which said user is located). This interface is preferably a remote control, of the infrared or high-frequency type, but it can also be a keyboard connected to the local node.

For example, the user can send a first remote control signal informing the local node that he wishes to assign an identifier to a target node (which by default is the local node itself) and then send another remote control signal, also of the first type, conveying the number or the corresponding string of alpha-numeric characters.

According to a preferred variant of the invention, by default, said identified node is said local node.

Advantageously, the unique identifier for said identified node is stored in said local node.

In particular, it will be chosen to store it in a permanent storage means so that it can be kept in the memory by the node even when the network is powered-off, for example in the event of a current failure or an updating of the topology of the network.

Preferably, the performing of said function for the identification of a piece of equipment of said network by said local node comprises a step during which said local node sends at least certain of the other nodes the unique identifier of said identified node.

In a preferred embodiment of the invention, when said piece of equipment of said network is a terminal, the performing of said function for the identification of a terminal by said local node comprises the following step:
  said local node sends at least certain of the other nodes an identifier of a group of connection plug(s) comprising one or more connection plugs included in said identified node and through which one of said terminals may be connected to said identified node,
  so that each terminal is identified firstly by the identifier of the node with which it is connected and secondly by the identifier of the group of connection plug(s) through which it is connected to said node.

This is an absolutely novel and inventive approach to the management of the terminals of a home audiovisual network. Indeed, what is proposed is an unique and lasting identification of each of the terminals of such a network on the basis, firstly, of an identifier of the node to which they are connected and, secondly, an identifier of the connector or connectors of the node to which they are connected.

Each of the nodes has knowledge of the identifier of each of the pieces of equipment of the network and may therefore accurately route the signals intended for each of the terminals or the other nodes of the network. For example, in a particular embodiment of the invention, each of the nodes of the network memorizes a table assembling all the information for identifying the terminals and nodes of the network in a permanent storage means of the flash memory type.

According to a first advantageous variant of the invention, said groups of connection plugs are defined so as to assemble, within one and the same group, neighboring connection plugs in said identified node.

For example, two or three contiguous connection plugs in the node are assembled to form a connector to which a particular identifier is assigned and through which a terminal can be connected to the node.

According to a second advantageous alternative embodiment of the invention, for at least certain of said identified nodes, said groups of connection plugs are defined so as to functionally assemble, within one and the same group, all the connection plugs needed for the connection of one of said terminals to said identified node.

According to this second alternative, the connection plugs are therefore assembled as a function of the functionality that they provide to a terminal that is connected to them. Thus, in a particular embodiment of the invention, a group assembles the "Svideo in" and "Audio in" connection plugs of a node because the set of these two plugs is needed for the connection of a television set to the node.

Preferably, said groups of connection plugs are defined, for a given node, according to a hierarchical structure, at least one of said groups including at least one other group of connection plugs of said node.

Indeed, if we take up the previous example again, the group of connection plugs associated with the "television set" functionality can be complemented by the "Svideo out" and "Audio out" connection plugs so as to form a group of plugs associated with the "video tape recorder" functionality.

Preferably, the performing of said function for the identification of a piece of equipment of said network by said local node comprises a step for verifying the identifier given by the user via the first remote control signal, so that said local node validates the supply of said unique identifier for said identified node, if said identifier given by the user verifies at least one predetermined condition.

If the identifier is a number, a predetermined condition may be the membership of the number in an interval of particular values, for example. The local node may also verify that the identifier given by the user has not been previously assigned to another node of the network.

Advantageously, if the result of said verification step is positive, said identified node is stored in said local node.

According to a second advantageous characteristic of the invention, said predetermined function, performed by the local node after the processing of a first remote control signal, and possibly after the processing of at least one other remote control signal, is a function for the selection of a piece of equipment of the network.

Indeed, it is especially advantageous for a user to be able to make a remote selection, from a local node, of a digital terminal or analog terminal or another node of the network located for example in another room of the dwelling, for example in order to set up a connection with the piece of equipment or to control it remotely.

Advantageously, said selection function belongs to the group comprising:
functions for the selection of a source node;
functions for the selection of an input node;
functions for the selection of an input terminal;
functions for the selection of a destination node;
functions for the selection of destination node terminal.

Thus, a user, from a local node located in his living room, can select his hi-fi system which is in his drawing room, for example to increase the sound volume. Again, from this same local node, he can select a source node consisting of a satellite reception device, for example in order to transmit audiovisual signals to the television set in the living room.

Advantageously, said function for the selection of a piece of equipment of said network comprises itself a selection step during which said user indicates firstly the identifier of a node called a target node to which said terminal is connected and, secondly, the identifier of a group of connection plug(s) through which said terminal is connected to said target node so as to select said terminal.

According to an advantageous characteristic of the invention, said selection step is carried out:
a first time for the selection of a first terminal called a destination terminal;
a second time for the selection of a second terminal called an input terminal,
so as to set up the launching of a connection between said first and second terminals for the transmission of audiovisual signals from said input terminal to said destination terminal.

According to a third advantageous characteristic of the invention, said predetermined function, performed by the local node after the processing of a first remote control signal, and after the processing of at least one second remote control signal, is a function, called learning function, for the network to learn at least one second remote control signal.

In other words, what is proposed is the learning by the network of the signals specific to the terminals. In this way, during a utilization phase that follows a learning phase, the user can do without the second remote control pack or packs.

The invention proposes the introduction into the nodes of the network of a novel functionality for the learning of remote control signals specific to the terminals so as to make the network and the terminals interconnected by the network simpler to use and more user-friendly. The learning can advantageously be done from any node of the network, the results of the learning being stored in the network.

Furthermore, the invention makes it possible, with a single remote control pack, to control the functionalities specific to the nodes of the network and achieve the remote control of the terminals (without the user having to use a second remote control pack specific to a terminal of the network (for example the infrared remote control of a television set)).

Preferably, said learning function is implemented according to the following successive steps:
Ib: with a first remote control pack, a user sends at least one first specific remote control signal to said local node, known as a first launching remote control signal;
Ic: after reception of said first launching remote control signal, the local node goes into learning mode;
Ie: with a second remote control pack, said user sends said local node at least one second remote control signal;
If: after reception, the local node stores said at least one second remote control signal, possibly after having made it undergo a predetermined processing operation, in the form of at least one second learned remote control signal.

Thus, at least one first (launching) remote control signal is used to initiate the learning phase. Furthermore, the local node at least temporarily stores the second learned remote control signal.

Preferably, the implementation of said learning function furthermore comprises the following step, preceding said step Ib:

Ia: the selection by the user of said target terminal designed to be controlled by said second learned remote control signal.

A selection of this kind is made possible by the identification, uniquely and permanently, of each of the terminals of the network. The target terminal selected is the one to which the second learned remote control signal is routed, during the utilization phase. Furthermore, a selection of this kind of the target node enables the selection of the target node to which it is connected so that it is possible subsequently to store therein the control signals that have been the object of a learning operation.

Advantageously, the implementation of said learning function furthermore comprises the following step, after the said step Ic:

Id: the assigning, by the user, of an identifier to said second learned remote control signal, designed to be stored with said second learned remote control signal, during the step If.

An assigning, such as this, of an identifier, as chosen by the user, thus makes the calling of the second learned remote control signal more user-friendly during the utilization phase.

According to one characteristic advantage of the invention, said learning phase I furthermore comprises the following steps, after the step If:

Ig: the transmission of said at least one second learned remote control signal and possibly of said identifier, assigned to this remote control signal, from the local node to the target node to which the target terminal is connected;

Ih: the storage in the target node of said second learned remote control signal and possibly said identifier assigned to this remote control signal.

In general, the local node and the target node are distinct but the invention also relates to the case where the two nodes (local node and target node) are the same.

Thus, each node stores the second learned signals pertaining to the terminals that are connected to it. In this way, a centralized management of the storage of the remote control signals within the network of the invention is prevented, such a management being distributed among all the target nodes of the network.

In a first variant of the invention, the second learned remote control signal is stored in (at least) one piece of equipment of the network other than the target node.

In a second variant of the invention, the second learned remote control signal is stored in all the nodes of the network.

Advantageously, said predetermined function performed by the local node after the processing of a first remote control signal, and possibly after the processing of at least one other remote control signal, belongs to the group comprising:

adding functions used to add a second learned remote control signal;

modification functions used to modify a second learned remote control signal;

cancel functions used to eliminate a second learned remote control signal.

According to an advantageous characteristic of the invention, said predetermined function, performed by the local node after the processing of a first remote control signal, called specific selection remote control signal, and possibly after the processing of at least one other remote control signal, is a function for the selection of at least one second learned remote control signal, allowing to activate the routing of said second learned remote control signal, from a target node to a target terminal, said target terminal being connected to said target node.

According to a first alternative embodiment, said function for the selection of at least one second learned remote control signal is a direct selection function, performed by the local node after the processing of a direct selection signal by which the user directly identifies said second learned remote control signal that he intends to select.

This first variant requires the user to store an identifier of the second learned remote control signal.

According to a second alternative embodiment, said function for the selection of at least one second learned remote control signal is an undirect selection function, according to which the local node performs the following step:

IIa: the recovery by the local node of a list of second learned remote control signals pertaining to the target terminal;

and said undirect selection function is performed by the local node after the processing of an undirect selection signal by which the user indirectly, by a choice in this list, identifies said second learned remote control signal that he intends to select.

Unlike the first alternative embodiment, this second variant releases the user from any effort of storage.

Preferably, said recovery step IIa itself comprises the following steps:

the local node sends the target node a request for information on the target terminal;

in response to said request for information, the target node sends the local node a list of identifiers of second learned remote control signals stored by the target node and pertaining to the target terminal.

Thus, the local node has a list that it can display so that a user can consult it and select one of its items.

Preferably, when performing said function for the selection of at least one second learned remote control signal, the local node also performs the following steps:

IIb: after the reception of said first selection remote control signal, the local node sends the target node a message for activating the routing of at least one selected second learned remote control signal;

IIc: after the reception of said routing activation message, the target node recovers and sends the target terminal, through at least one predetermined link between the target node and the target terminal, said second learned remote control signal selected by the user.

According to a fourth advantageous characteristic of the invention, said predetermined function performed by the local node after the processing of a first remote control signal, and possibly after the processing of at least one other remote control signal, belongs to the group comprising:

connection functions used to set up a connection between two pieces of equipment of the network selected beforehand;

disconnection functions by which a previously set-up connection can be ended.

Preferably, said home audiovisual network is a switched type of network.

Preferably, said first and second remote control signals are signals belonging to the group comprising: infrared remote control signals; high frequency remote control signals.

These signals may also be of any other type suited to the implementation of the invention and especially, for example, high frequency signals.

According to an advantageous variant of the invention, said first remote control pack emulates at least one function of said second remote control pack so as to be able to send at least certain of the second remote control signals.

In the special case where all the functions of the second remote control pack may be emulated by the first pack, only this first pack is needed by the user to implement the functionalities of the network, thus making its use simpler.

The invention also relates to an audiovisual signal exchanged between a local node and a target node of a home audiovisual network, said signal transparently conveying a remote control signal specific to at least one terminal of said network and sent by at least one remote control pack associated with said terminal.

Advantageously, said signal is organized into successive packets each comprising:
- a header containing especially a piece of information on the target node and possibly a target terminal connected with said terminal node;
- a data field containing especially at least a part of said specific remote control signal.

The invention also pertains to an audiovisual signal exchanged between a target node and a target terminal of a home audiovisual network, said signal transparently conveying a remote control signal specific to said target terminal and sent by at least one remote control pack associated with said target terminal, to another node of the network.

A signal of this kind has for example a structure identical to the corresponding signal exchanged between the local node and the target node.

The invention also relates to a device contained in a home audiovisual network comprising a plurality of nodes used to interconnect a plurality of terminals. At least the two following types of remote control signals being used within said network, namely:—first remote control signals specific to the nodes and transmitted by at least one first remote control pack associated with the nodes; and—second remote control signals, specific to the terminals and transmitted by at least one second remote control pack associated with at least one of said terminals. Said device comprises:
- means for the reception of a remote control signal;
- means for the analysis of the type of remote control signal received;
- means for the processing and performance of at least one predetermined function that are activated if the remote control signal received is one of the first remote control signals;
- means for the transparent transmission of said remote control signal received to another node, called a target node: said transmission means being activated if the remote control signal received is one of the second remote control signals and if said target node, to which a target terminal is connected, has been determined beforehand,
- said transmission means being not activated if the remote control signal received is one of the second remote control signals and if no target node has been determined beforehand.

Preferably, said device furthermore comprises means by which a user can assign a unique identifier to any node of the network, called an identified node, and to which it is possible to connect at least one of target terminal, said unique identifier being supplied through a man/machine interface included in one of the nodes of the network, called a local node.

Advantageously, said device furthermore comprises:
- first means for the reception of at least one first launching remote control signal, sent by the user with a first remote control pack;
- means for switching into learning mode activated when said first reception means receive said at least one first launching remote control signal;
- second reception means for the reception, in said learning mode, of at least one second remote control signal sent by the user with a second remote control pack;
- means for the storage, in said learning mode, of said at least one second remote control signal received, possibly after having made it undergo a predetermined processing, in the form of at least one second learned remote control signal;
- third means for the reception of at least one first remote control signal for the selection of said at least one second learned remote control signal, sent by the user with the first remote control pack;
- means for switching into utilization mode, activated when said third reception means receive said at least one first selection remote control signal;
- means for the activation, in said utilization mode, of the routing of said at least one second learned remote control signal from said target node to said target terminal.

The invention also relates to a local node of a home audiovisual network comprising a plurality of nodes enabling the interconnection of a plurality of terminals, comprising a device as defined above.

The invention also relates to a device included in a home audiovisual network comprising a plurality of nodes used to interconnect a plurality of terminals. At least the two following types of remote control signals being used within said network, namely:—first remote control signals specific to the nodes and transmitted by at least one first remote control pack associated with the nodes; and—second remote control signals, specific to the terminals and transmitted by at least one second remote control pack associated with at least one of said terminals. Said device comprises:
- means for the reception of at least one of said second remote control signals transmitted transparently by a node of the network, called a local node;
- means for the retransmission of said second remote control signal to a target terminal, the target terminal being connected to the device through at least one predetermined link between said device and the target terminal.

Preferably, said device furthermore comprises:
- means for the reception of a routing activation message, sent by the local node and indicating at least one second learned remote control signal that has been selected by a user;
- means of recovery, within the network and preferably in storage means included in said device, of said second learned remote control signal that has been selected by the user;
- means for the transmission, to the target terminal, through at least one predetermined link between said device and the target terminal, of said second learned remote control signal after it has been recovered by the recovery means.

The invention also relates to a target node of a home audiovisual network comprising a plurality of nodes for the interconnection of a plurality of terminals, comprising a device as defined above.

The invention also relates to a target terminal being connected, through at least one predetermined link, to a target node of a home audiovisual network, said target terminal being of a digital type. Said predetermined link between said target node and said target terminal is borne by a digital bus, preferably of the IEEE 1394 type, used as a medium for connecting the target terminal to the home audiovisual network. Said target terminal further comprises means for the reception and processing of specific remote control signals transmitted by said target node, wherein said remote control signals are sent from a remote control pack, associated with said target terminal, to a node of the network, called a local node, said local node transparently transmitting said remote control signals to said target node.

The invention also relates to a computer program comprising instruction sequences adapted to the implementation of a method as defined above when said program is executed on a computer.

The invention also relates to a computer program for the processing of remote control signals within a home audiovisual network comprising a plurality of nodes used to interconnect a plurality of terminals. At least the following two types of remote control signals being used within said network, namely:—first remote control signals specific to the nodes and sent by at least one first remote control pack associated with the nodes; and second remote control signals specific to the terminals and sent by at least one second remote control pack associated with at least one of said terminals. Said computer program product comprises program code instructions recorded on a medium that can be used in a computer, comprising:

- programming means readable by computer to carry out a step for the analysis of the type of remote control signal received by a node of the network, called a local node;
- programming means readable by computer to carry out a step for the processing and implementation of at least a predetermined function if the remote control signal received is one of the first remote control signals;
- programming means readable by computer to carry out a step for the transparent transmission of said received signal to another local node, called a target node to which a target terminal is connected, if the received remote control signal is one of the second remote control signals, and if said target node has been determined beforehand;
- programming means readable by computer to carry out a step for the rejection of said received remote control signal if the received remote control signal is one of the second remote control signals, and if no target node has been determined beforehand;
- programming means readable by computer to carry out a step for the transparent transmission from the target node to the target terminal of said received signal sent by said local node to said target node.

BRIEF DESCRIPTION OF THE DRAWINGS

Other features and advantages of the invention shall appear from the following description of a preferred embodiment of the invention, given by way of a non-restrictive exemplary indication, and from the appended drawings, of which:

FIG. 9 shows the structure for the storage of data needed for the routing of the packet of FIG. 8;

MORE DETAILED DESCRIPTION

The general principle of the invention relies on the implementation, within a home audiovisual network, of two types of distinct remote control signals and on the analysis, in a node of the network, of the type of signal received to decide on the treatment to be applied to it.

Figure 1:
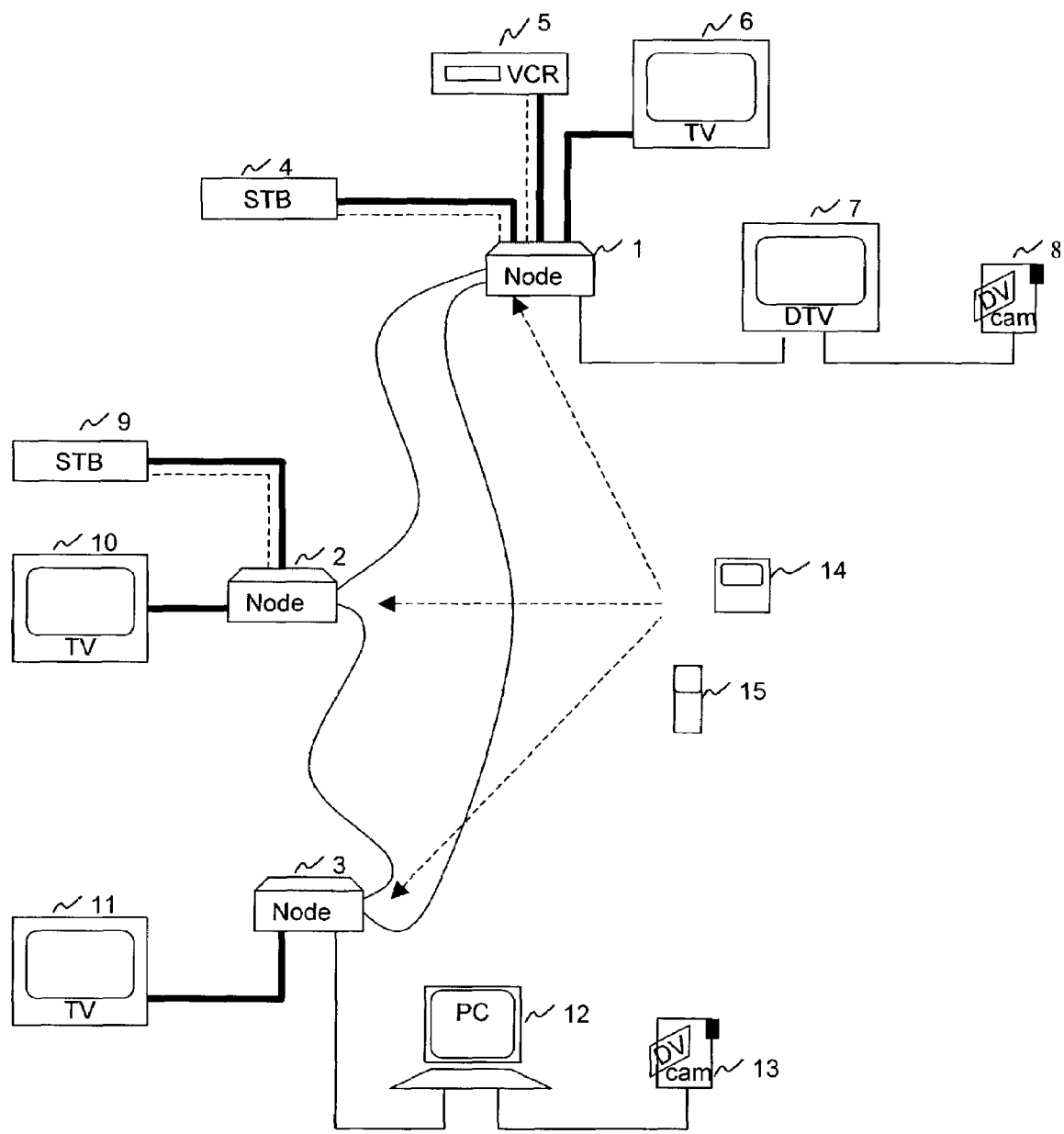
FIG. 1 shows a block diagram of a home audiovisual network according to an embodiment of the invention.

Referring to FIG. 1, we shall now present an embodiment of a home audiovisual network according to the invention.

A network of this kind comprises a plurality of analog and/or digital audiovisual terminals connected to one another by different types of interfaces planned within the context of the invention.

Thus, the network of FIG. 1 has three nodes referenced 1, 2 and 3 connected to one another by an IEEE 1355 type digital interface.

The node referenced 1 is connected by an analog interface cable, used to convey video signals and audio signals into stereo mode, with three analog terminals, namely:

- an analog multimedia decoder (or set top box, this term being used hereinafter in the document) referenced 4 which may be a tuner for the reception of satellite signals or a pay television decoder for example);
- a video tape recorder or an analog video cassette reader referenced 5;
- an analog television set referenced 6.

An infrared type cordless wire (shown in dashes in FIG. 1) can furthermore be set up between the node referenced 1 on the one hand and the set top box 4 or the video tape recorder 5 on the other hand. A link of this kind is used to transfer remote control signal from the node from the set top box 4 or the video tape recorder.

Although it is not shown in FIG. 1, a link of this kind can of course exist between each of the terminals of FIG. 1 and the node of the network to which it is connected.

The node referenced 1 is also connected to a digital television set 7 by an IEEE 1394 type digital interface cable. A digital camcorder 8 is a source of audiovisual signals for the digital television set 7 to which it is connected by a cable for an IEEE 1394 type digital interface.

In the exemplary embodiment of FIG. 1, the node referenced 2 is connected to two analog terminals, namely a set top box 9 and a television set 10, by an analog interface cable used to convey video signals and audio signals in stereo mode. A cordless link furthermore connects the set top box 9 and the node referenced 2.

Finally, the node referenced 3 is connected firstly to an analog television set 11 by a cable for analog interfaces and secondly to a computer 12 by a IEEE 1394 type digital interface cable, the computer 12 itself being connected to a digital camcorder 13 by an IEEE 1394 type interface.

All the audiovisual terminals connected to one and the same node of the network of FIG. 1 are considered to be local terminals for this node. The other terminals are considered to be remote terminals for this node.

A first remote control 14 is used to send specific control signals to each of the nodes referenced 1, 2 and 3 of the network of FIG. 1. Such signals, specific to the nodes, activate for example the implementation of the identification functions of a target node, the selection of a piece of equipment of the network or the connection/disconnection of equipment of the network.

A second remote control 15 specific to at least one analog terminal of the network is used to send control signals, for example of the infrared type, to the analog terminals of the network of FIG. 1 (for example the analog video tape recorder 5 or the set top box 9). These signals are for example read commands, image freeze commands or pause command for the video tape recorder 5.

In an alternative embodiment of the invention, it is possible to use only the first remote control 14 if this remote control can emulate the behavior of the remote control 15 as is presently the case for universal remote controls. The user therefore needs only one remote control, and this simplifies the use of a network.

The nodes referenced 1, 2 and 3 can send back the remote control signals coming from the remote control 15 to the analog terminals to which they are linked, in the form of infrared signals for example or by means of the analog interface cable that connects them to the terminals. In one alternative embodiment of the invention, the signals are conveyed in the form of packets of identical structures, between a local node and a target node of the network on the one hand and between the target node and the target terminal on the other hand.

Figure 2:
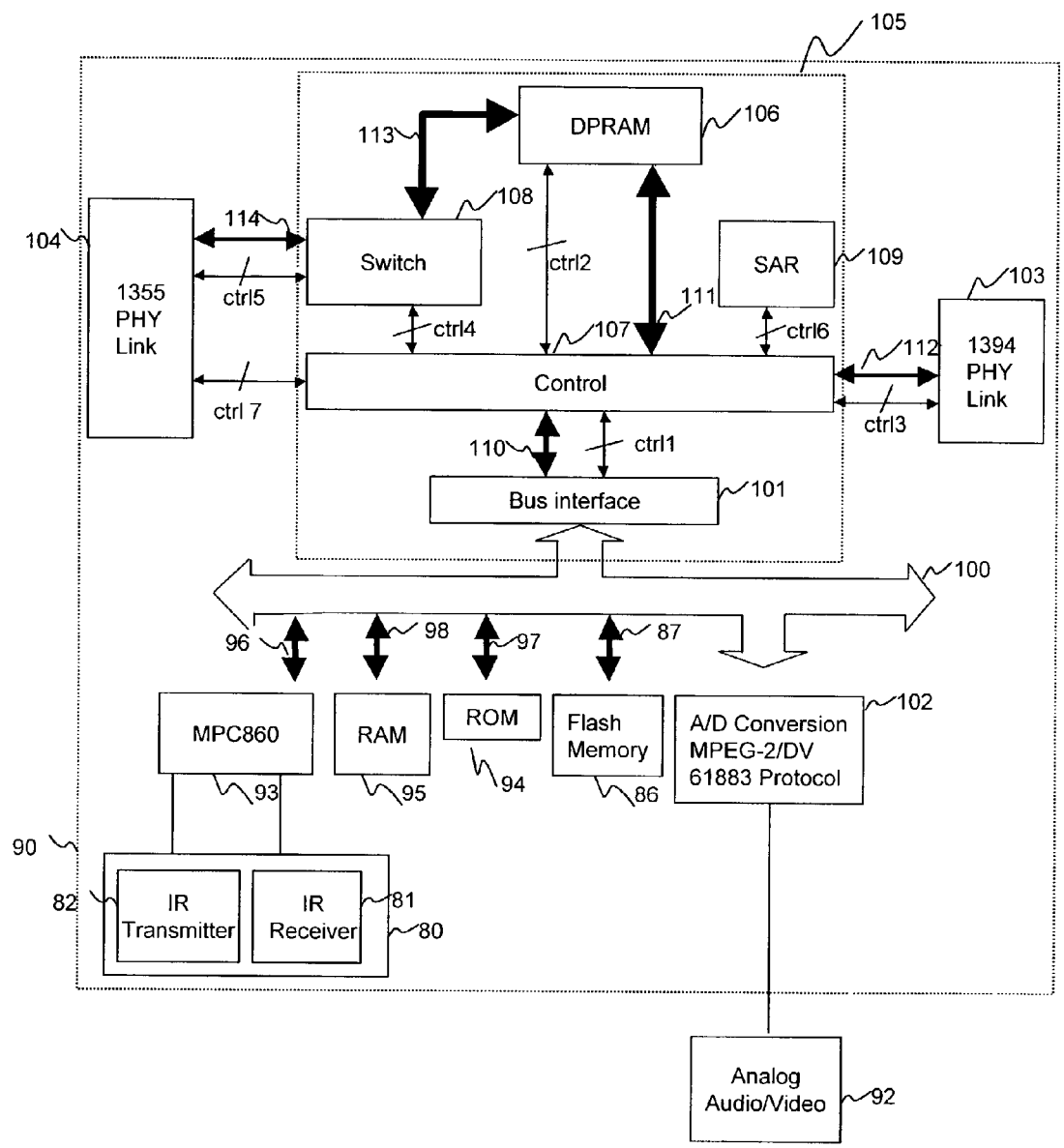
FIG. 2 shows a block diagram of an exemplary node of the home audiovisual network of FIG. 1.

FIG. 2 shows a block diagram of a switching device 90 of a node of the home audiovisual network of the invention connected to two serial communications means according to the IEEE 1394 and IEEE 1355 standards.

The node shown in FIG. 2 is also connected to one or more other nodes of the switched audiovisual network to which it belongs.

In the embodiment shown in FIG. 2, it has been chosen to represent an analog audiovisual interface 92 associated with the switching device 90. An interface 92 of this kind is connected to an analog/digital conversion module 102 which also has a streaming protocol according to the video standard 1394. The conversion module 102 furthermore has MPEG-2 means (Moving Pictures Expert Group means according to the ISO/IEC 13818-1, 13818-2, 13813-3 standards) and DV (digital video) means according to the DV IEC 61834 standard described in the document "Specifications of consumer use digital VCRs using 6.3 mm magnetic tape", December 1994, "HD digital VCR conference", as well as processing means according to the IEC-61883 protocol (as defined in the "International Standard Consumer Audio/Video Equipment—Digital Interface, first edition 1998-02, IEC 61883-1/2/3/4/5") for conveying audio/video digital signals.

The switching device 90 comprises:
  a microcontroller 93 which for example is of the Motorola (registered trademark) MPC860 type. A microcontroller of this type has input/output interfaces which for example connect an infrared transmitter/receiver;
  a ROM type permanent storage means 94;
  a RAM type temporary storage means 95 associated with the microcontroller 93 into which an initialization software architecture is loaded; and
  a permanent storage means 86 of the flash memory type used to permanently store certain data (for example data resulting from the unique identification of a node within the home audiovisual network of the invention).

The storage means 95 is capable of storing data packets of different types, especially:
  asynchronous packets of the type conforming to the IEEE 1394 standard;
  packets constituting messages in unconnected mode (asynchronous packets) of the type conforming to the IEEE 1355 standard;
  control packets of the type conforming to the IEEE 1355 standard;
  stream packets of the type conforming to the IEEE 1355 standard.

The packets of the type conforming to the IEEE 1355 standard really exist in the component 104 but are not stored in this form in the RAM storage means 95. It will be noted that the storage means 95 contain the information needed to generate the IEEE 1355 packets.

The microcontroller 93 is furthermore connected to an infrared module 80 comprising reception means 81 and transmission means 82 for infrared signals. A module 80 of this kind may furthermore carry out an analog/digital conversion and a digital/analog conversion of the signals.

These four elements 86, 93, 94 and 95 communicate by means of the respective address and data buses referenced 87, 96, 97 and 98.

In particular, they can exchange data by means of a main bus 100 with at least one bus interface component 101. Should the bus 100 be a PCI (peripheral component interconnect) standard bus, the component 101 may be a bus called the AMCC 5933QC commercially distributed by Applied Micro Circuits Corporation (registered mark).

The bus 100 can also connect other elements not shown in FIG. 2 to one another. These other elements are themselves provided with an interface bus and can implement for example data processing functions.

As shown in FIG. 2, the node according to the invention also has interfacing means 103 and 104.

The means 103 are designed to provide an interface between the node 90 and the serial communication bus designed to work according to the IEEE 1394 standard to which said node is attached. It conforms to the "IEEE Std 1394a-2000, Standard for a High Performance Serial Bus (Supplement)".

It may be recalled that the IEEE 1394 standard is described in the following referenced documents:
  IEEE Std 1394-1995, Standard for High Performance Serial Bus;
  IEEE Std 1394a-2000, Standard for High Performance Serial Bus.

A third document "IEEE P1394.1 Draft 0.17 Standard for High Performance Serial Bus Bridges" describes the way to connect the different IEEE 1394 buses.

The interfacing means 103 is a set of PHY/LINK 1394 components constituted for example by a component PHY TSB21LV03A and a component LINK TSB12LV01A commercially distributed by the firm Texas Instruments (registered mark) and connectors 1394, for example commercially distributed by the firm MOLEX (registered mark) for example under the reference 53462.

The interfacing means 103 comprises at least one external port designed to be connected to the digital terminal that is attached to the serial communications bus 1394.

The interfacing means 104 mentioned here above is an IEEE 1355 interface component with three ports. It has especially a component C113 (referenced 120 in FIG. 2) commercially distributed by the company 4LINKS (Registered Mark) as well as three interface components LUC1141MK commercially distributed by the company LUCENT (Registered Mark). These components are themselves connected to IEEE 1355 connectors, for example commercially distributed by the firm HARTING (Registered Mark). The component C113 is itself based on a Spartan XCS30XL FPGA (field programmable gate array) type programmable component, commercially distributed by the firm XILINX (Registered Mark).

The three external ports of the interfacing means 104 are designed to be connected to ports of the same type on another switching node of the switched network, thus enabling the device 90 to communicate with another node of this network.

The device 90 also has a data flow control means 105 that is used to transfer data among the different interface components 101, 103 and 104. This means 105 is formed by programmable logic means executed by an FPGA type component, for example the component referenced VIRTEX, commercially distributed by the company XILINX.

This means 105 especially implements a dual port storage unit 106 used to store data addressed to or coming from the 1355 standard switched network.

The dual port storage unit has a storage capacity of less than 2 Mbits and is made for example in a form of a 32-bit access DPRAM type memory.

The initials DPRAM refer to "dual port random access memory".

The storage unit 106 has a plurality of memory zones managed as individual FIFO (first-in first-out) type memories.

A memory zone of this kind corresponds to a memory in which the data elements are read in the order in which they were written beforehand.

These memory zones each comprise a read pointer and a write pointer that are associated with each other.

Since each memory zone is managed as a FIFO type memory, it can be filled and emptied at the same time and independently. This desynchronizes the data read and write operations, performed by a switching unit 108 that will be defined here below, from the data read and write operations performed by the control module 107.

Indeed, the occupancy rate of the memory zone considered is managed circularly and it is known, at all times, whether the data contained in a memory zone have been read or not. When these data have been read, then new data can be written in their place.

The dual port memory unit is, so to speak, a queue for the packets and the storage function is carried out independently, depending on the port by which the packets reach the memory unit.

In general, all the isochronous (stream) or asynchronous data coming from the switched network are stored in the storage unit 106.

This storage is temporary for the asynchronous data packets (namely packets constituting a message transmitted in non-connected mode) and for the control packets which are then transferred into the RAM storage means 95 for storage for a longer duration.

By contrast, the isochronous data packets (stream type packets, namely packets transmitted in connected mode) are stored only in this storage unit 106 before being transmitted on the communications bus, to which the switching node 90 is connected, or on the switched network.

This can be explained by the fact that this type of data must be transferred as speedily as possible from the switched network to the bus and must therefore be stored in a storage means that is easily and swiftly accessible.

Similarly, the isochronous or stream data packets that come from the communications bus to which the switching node 90 is connected and are intended for the switched network, are stored only in the storage unit 106 and not in the storage means 95 for the same reasons as those referred to here above.

Thus, as shown in FIG. 1, the data flow control means 105 comprises several other elements, including a control module 107 (already mentioned here above) that carries out a function of checking the storage unit 106, a switching unit 108 (already mentioned further above) in communication with the interfacing means 104, with the storage unit 106 and the control module 107 as well as a segmentation and reassembling (SAR) or data packet arranging unit 109 that is linked to the control module 107.

It will also be noted that the control module 107 communicates with the interfacing means 103 and 104 as well as with the bus interface component referenced 101.

The control module 107 has the function of multiplexing the read or write accesses to registers of other modules from the main bus referenced 100.

The module 107 also has control over the bus interface component 101 for the read and write operations on the main bus 100, including especially transfer in burst mode.

The control module 107 is also responsible for activating interruptions on the main bus 100 as a function of particular communications events.

This module exchanges data elements with the component 101 on an add-on bus 110 following the control signals referenced ctrl1.

As indicated here above, the module 107 is responsible for controlling the storage unit 106 with respect to the read and write operations in FIFO mode, in the special case where the bus interface component 101 is an AMCC, by means of a data bus 111 and control signals ctrl2.

The interfacing means 103 contain FIFO type memories used during the transfer of data packets of a type conforming to the IEEE 1394 standard. It has two transmission FIFO memories known as an ATF (asynchronous transfer FIFO) and an ITF (isochronous transfer FIFO) and one reception FIFO memory known as a GRF (general receive FIFO). These FIFO memories are extensively described in the literature associated with the component LINK TSB12LV01A.

The control module 107 and the interfacing means 103 manage the data transfer on a bus 112 according to the control signals ctrl3.

Furthermore, the control module 107 controls the switching unit 108 by means of control signals ctrl4 in order to transfer data from the switching unit to the storage unit 106 by means of a data bus 113 and vice versa.

The switching unit 108 is connected to the interfacing unit 104 by means of a data bus 114 and control signals ctrl5.

The data packet arranging unit or SAR (segmentation and reassembling) unit 109 informs the control module 107 of the next data packet or packets to be transmitted, by means of control signals ctrl6.

Furthermore, the SAR unit 109 verifies the reception of the data packets and manages the allocation and the releasing of memory zones (known as buffers) of the storage unit 106.

The control signals ctrl7 exchanged between the interfacing means 104 and the control module 107 comprise especially the clock signals regenerated from the reception of the packets 1355 on each of the three ports of the interfacing means 104.

A description is given here below, with reference to FIG. 3, of the different steps implemented in a local node of the network when this node receives a remote control signal from one of the remote control units 14 and 15 of FIG. 1 by means of the infrared module 80 of FIG. 2.

With a view to simplification, it is assumed throughout the remainder of the document that the remote control signals implemented in the context of the invention are of the infrared type. It will of course be clear to those skilled in the art that these signals may be of any other type and especially, for example, high frequency signals.

Figure 3:
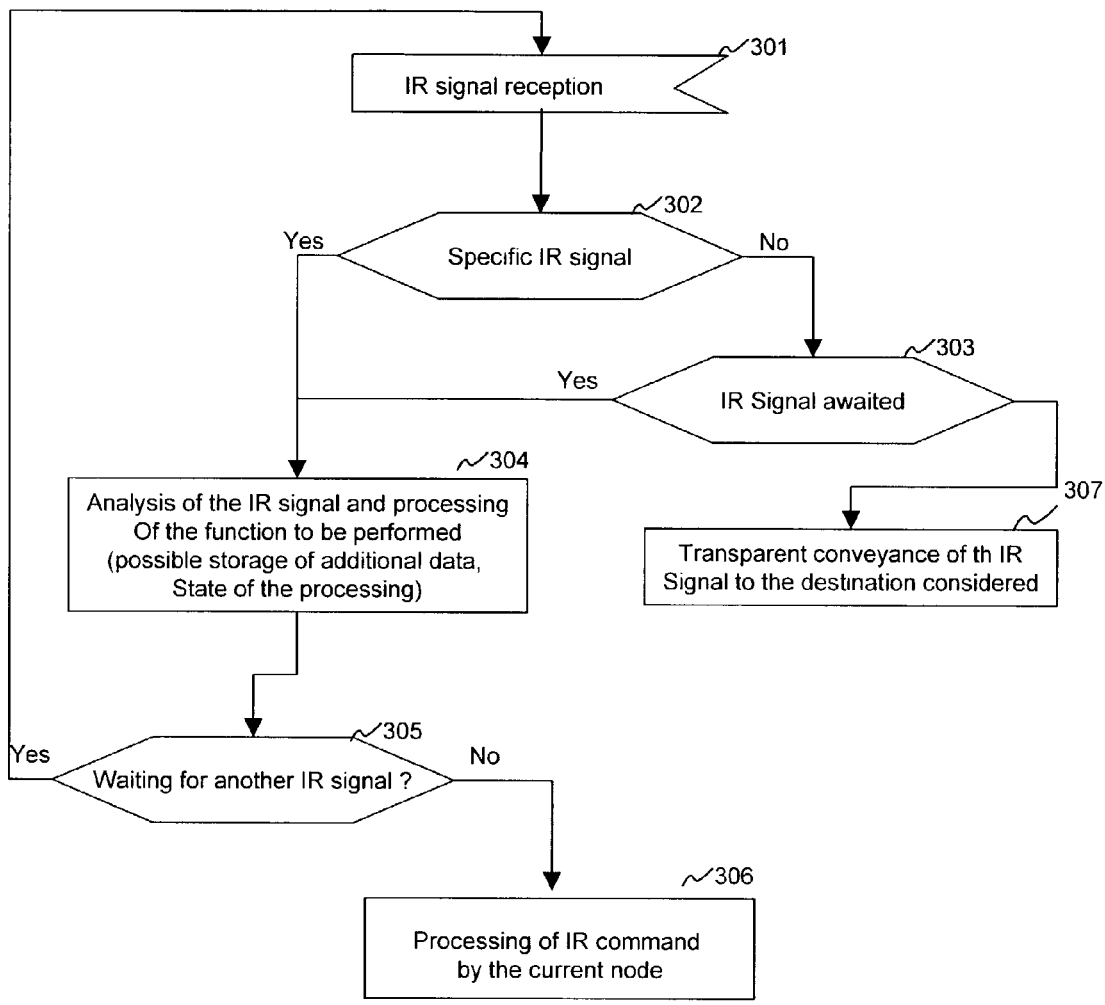
FIG. 3 describes the different steps implemented within the node of FIG. 2 upon reception of a remote control signal.

The algorithm described with reference to FIG. 3 is stored in the ROM 94 associated with the switching device 90 of the local node. When the system is powered on, this algorithm is loaded into the RAM 95 and the microcontroller 93 will execute the corresponding instructions.

During a step referenced 301, the local node (for example the node referenced 2 of FIG. 1) receives a remote control signal coming from one of the remote controls 14 or 15 illustrated in FIG. 1 by means of the infrared module 80 of FIG. 2.

The local node then starts an analysis 302 of the type of remote control signal received to ascertain that it is a remote control signal specific to the nodes of the network of the invention or specific to at least one terminal of this very same network.

If the remote control signal received is a type of signal specific to the nodes of the home audiovisual network of the invention, the local node implements an analysis 304 of the infrared signal received. It then processes the function to be fulfilled as a function of the contents of the infrared signal. The local node (305) verifies that the processing requires the reception of one or more other infrared signals.

If this is the case, the local node attends the reception (301) of another infrared signal.

If not, the infrared command received is complete and the local node can carry out (306) the actions required by the command.

If, on the contrary, the signal received during the step referenced 301 is not a signal specific to the nodes of the network of the invention, the local node checks (303) whether, owing to the preliminary reception of an infrared signal of a type specific to the nodes of the network, it was waiting for an infrared signal.

If so, the infrared signal received is processed (304) as described here above. For example, the local node has firstly received a signal indicating that the user wishes to assign an identifier to a node of the network and then a remote control signal conveying the identifier chosen by the user, as is illustrated hereinafter in the document with reference to FIG. 4. The local node can then store (306) the identification number of the node located between the user.

If the answer is negative, the infrared signal is conveyed transparently to a target node of the network of the invention selected beforehand. Should no node of the invention be present in the network, or should no node of the network be selected, the local node simply overlooks the infrared signal received.

For example, in the exemplary audiovisual network shown in FIG. 1, a user physically placed so as to be facing the node referenced 2 may use the remote control referenced 14 to select the video tape recorder 5 connected to the node referenced 1. The node 1 is then the target node for the remote control signal sent by the remote control referenced 14, and the node referenced 2 is the local node.

Thus the user of the remote control 14 may for example press a specific button of the remote control associated with a function for selecting a piece of equipment (node or terminal). He then uses the remote control 14 to introduce the number of the node that he wishes to select and then the number of the connector of this node to which the video tape recorder 5 is connected. This function shall be described in greater detail hereinafter with reference to FIG. 7. The user can then check the analog video tape recorder 5 from a node referenced 2 by using the remote control 15 that is specific to it.

Figure 4:
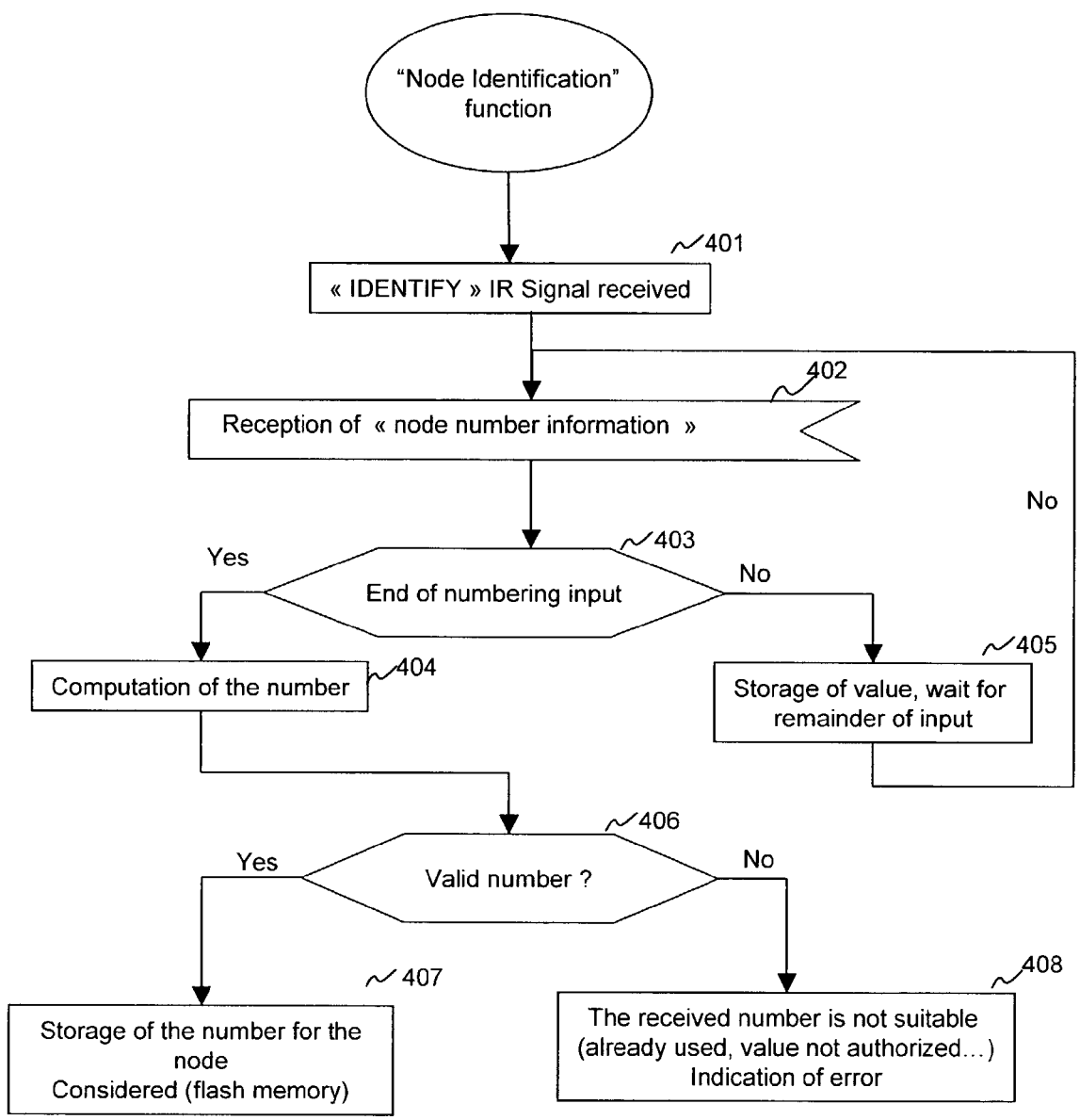
FIG. 4 illustrates the first exemplary function that can be implemented by a node of the network of FIG. 1 following the processing of FIG. 3, namely a function of identification of a node of a network.

As noted here above, FIG. 4 illustrates an exemplary function performed by a local node during the step referenced 306 of FIG. 3.

The algorithm described with reference to FIG. 4 is stored in the ROM 94 associated with the switching device 90 of the local node. When the power is turned on, this algorithm is loaded into the RAM 95 and the microcontroller 93 will execute the corresponding instructions.

The node identification function presented with reference to FIG. 4 is a function specific to the nodes of the network of the invention which, for simplicity's sake, shall be called the "IDENTIFY" function hereinafter in the document. This function is designed to allocate a single identifier to the local node which receives the infrared signal conveying the command "IDENTIFY". According to one alternative variant of the invention, a function of this kind allocates an identifier of this kind to a distant node.

With a view to clarity and simplification, hereinafter in the document, the description shall be limited to the preferred embodiment of the invention wherein the man/machine interface implemented by the user, during the phases of identification and selection of a terminal, is a remote control pack emitting control signals, for example of the infrared type, to the local node. It will be naturally quite easy for those skilled in the art to extend this description to any other embodiment of the invention implementing any other type of man/machine interface such as for example a set consisting of a screen and a keyboard.

Hereinafter the description shall be limited to the particular embodiment in which the identifier of the node is an identification number. It will of course be easy for those skilled in the art to extend this description to any other type of identification such as a string of characters, for example alphanumerical characters.

A user of the network of the invention wishing to assign an identifier to a node of the network sends control signals to the local node by means of the remote control 14.

As described here above with reference to FIG. 3, this specific command "IDENTIFY" is filtered and the local node carries out (306) the processing described hereinafter.

When the specific infrared signal "IDENTIFY" is received (401) by the local node, it awaits reception (402) of additional information in the form of infrared signals.

When such information has been received, the local node implements a test 403 to ascertain that it is still awaiting for new information or that all the information needed has been received to assign a single identifier to the node (which by default is the local node itself).

If the local node is still waiting for additional information, it stores the already received information in the RAM 95 and waits (405) for the next information.

If no additional information has to be received, the local node processes (404) the information received to obtain the number of the local node (or a remote node in an alternative embodiment of the invention).

It then carries out a test 406 to ascertain the validity of the number (or of the string of alphanumerical characters) obtained during the step referenced 404. Indeed, a number of this kind may be outside a permitted range of values or already used by another node of the network.

If the number is valid, it is allocated to the local node and stored (407) in the flash memory 86 so that it can be used, even after the network of the invention is powered off (for example in the event of a current failure or an updating of the topology of the network).

If the number is not valid, an error notification is sent (408) to the user, for example in the form of a sound signal or an error message on a screen associated with the local node.

After a node of the network of the invention has been assigned a single identification number, it is still necessary to make a unique identification of each of the terminals that are connected to it.

Figure 5:
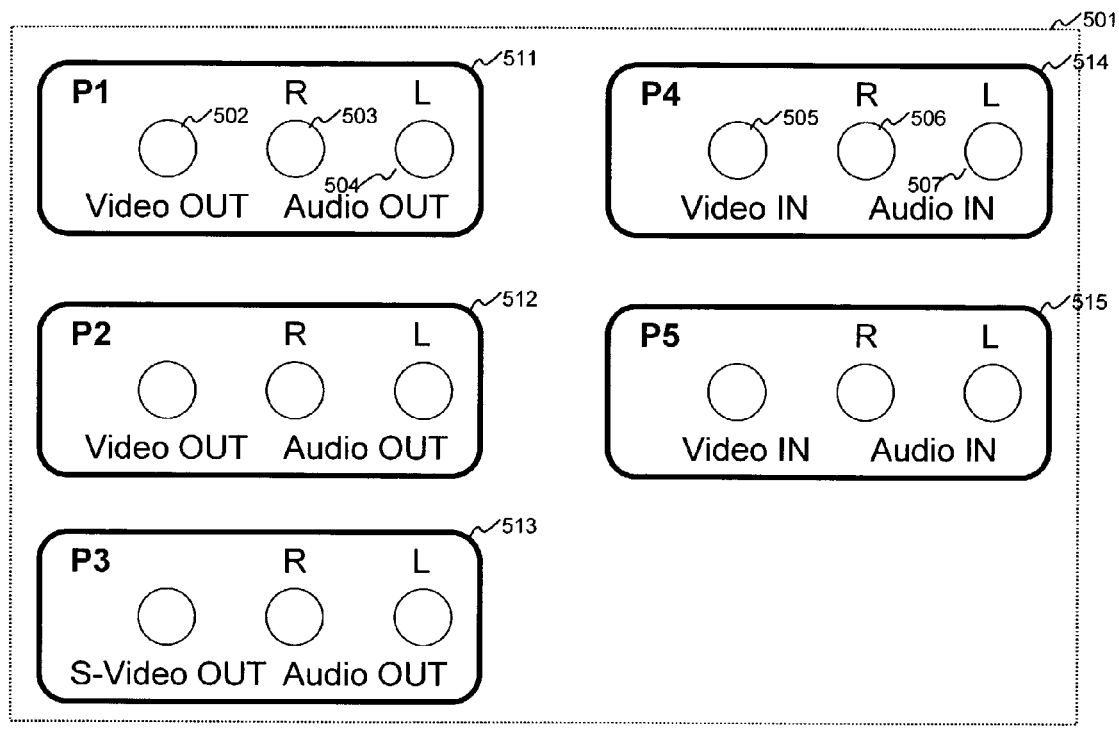
FIG. 5 shows a unique technique of identification of a physical connector of a node of the network of FIG. 1.
Figure 6:
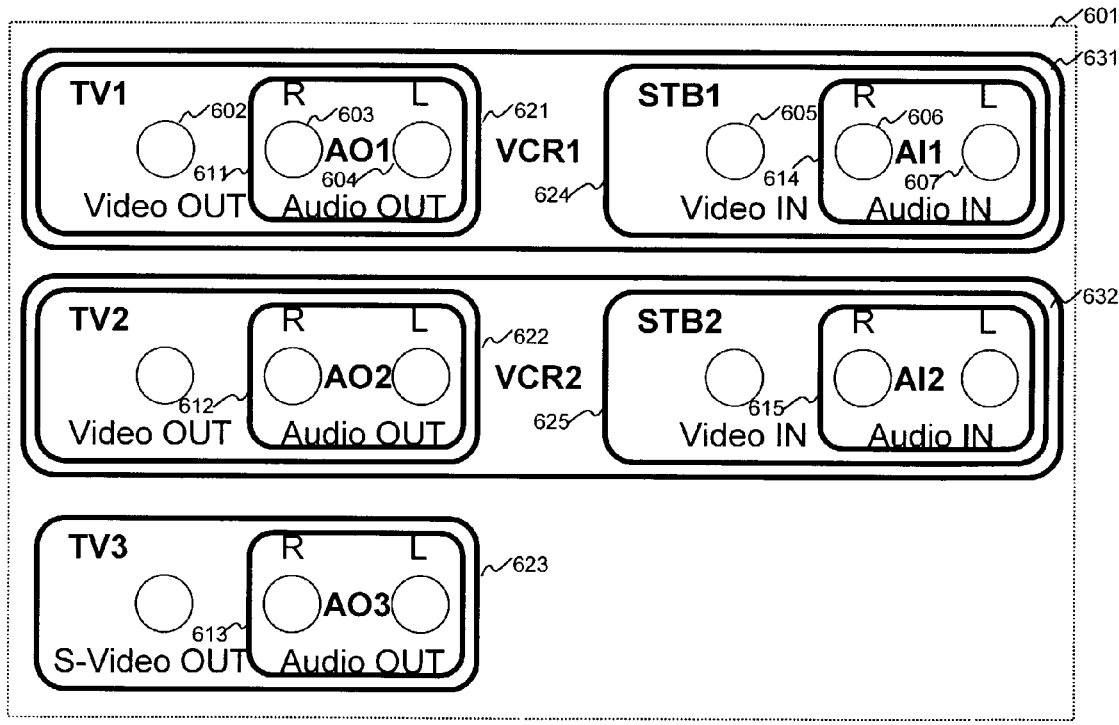
FIG. 6 shows a technique for the identification of a logic connector of a node of the network of FIG. 1.

FIGS. 5 and 6 show two approaches envisaged in the context of the invention:

FIG. 5 proposes a technique of identification of the analog terminals as a function of the physical connector to which they are connected;

FIG. 6 for its part proposes a logic numbering of the connectors of a node and hence of the analog terminals connected thereto.

FIG. 5 illustrates the different analog connector plugs 501 of a node in a particular embodiment of the invention.

Thus, the node has a video output 502, a right-hand audio output 503 and a left-hand audio output 504, a video input 505, a right-hand audio input 506 and a left-hand audio input 507. The plugs are physically combined to form audio/video outputs (511, 512, 513) or audio/video inputs (514, 515). Each of the groupings referenced 511 to 515 is used as a whole and identified by means of a number: for example the grouping referenced 511 is called a connector No. 1, the grouping referenced 512 is called a connector No. 2 and so on and so forth until the grouping referenced 515 which is associated with the connector No. 5.

In this way, an analog terminal connected to a node of the network may be identified solely from the unique identifier of the node assigned according to the method of FIG. 4 and a connector number (corresponding to the grouping of three connection plugs in the embodiment illustrated in FIG. 5) to which it is connected. Similarly, a digital terminal connected to a node of the network may be identified solely from the unique identifier of the node and the number of the digital connector to which it is connected (for example a digital connector of this kind not shown in FIG. 5 could be called the connector No. 6).

FIG. 6 shows another embodiment of the invention in which the analog connection plugs 601 of a node of the network are grouped differently from the embodiment of FIG. 5.

The node of the network considered comprises for example a video output 602, a right-hand audio output 603 and a left-hand audio output 604, a video input 605, a right-hand audio input 606 and a left-hand audio input 607.

In this embodiment, the connectors are grouped logically, according to a functionality with which they are associated. The groupings of connectors furthermore have a hierarchical organization, a given functionality associated with a particular grouping of plugs being capable of relying on the implementation of a subfunctionality associated with a sub-grouping of plugs.

Thus for example the following groupings of connector plugs are determined:
- the audio output functionality referenced 611 which uses the right-hand audio output plug 603 and the left-hand audio output plug 604;
- the audio output functionality referenced 612;
- the audio output functionality referenced 613;
- the audio input functionality referenced 614 which use the right-hand audio input plug 606 and the left-hand audio input plug 607;
- the audio input functionality referenced 615;
- the television output functionality referenced 621 which houses the video output plug 602 and the audio output sub-functionality referenced 611;
- the TV output functionality referenced 622;
- the TV output functionality referenced 623;
- the audiovideo input functionality referenced 624 which uses the video input plug 605 and the audio input sub-functionality referenced 614;
- the audio/video input functionality referenced 625;
- the video tape recorder input/output functionality referenced 631 which implements the TV output sub-functionality referenced 621 and the audio/video input sub-functionality referenced 624;
- the video tape recorder input/output functionality referenced 632.

Each of the groupings of plugs by functionality described here above is used as a whole and is identified logically by means of a single number. Thus, the grouping corresponding to the audio output functionality referenced 611 is called the connector function No. 1, the grouping corresponding to the audio output functionality referenced 612 is called a connector function No. 2 and so on and so forth up to the grouping corresponding to the video tape recorder input/output functionality referenced 632 which is called a connector function No. 12.

In this way, any analog terminal may be identified uniquely within the network, thus making it possible especially to send distinct commands to two identical terminals of the network, for example two video tape recorders connected to two distinct nodes of the network.

An analog terminal is thus identified solely from the unique identifier of the node to which it is connected, as shown in FIG. 4 and from the logic grouping of the connector plugs that it uses as shown in FIG. 6. For example, the video tape recorder 5 connected to the node referenced 1 of FIG. 1 is identified solely within the audiovisual network of the invention from the identification number of the node referenced 1 and the connector No. 11 function, corresponding to the video tape recorder input/output function referenced 631. Similarly, a digital terminal is identified solely from the unique identifier of the node with which it is connected and the digital connector number, not shown in FIG. 6, with which it is connected.

It is important to note that the alternative embodiments described with reference to FIG. 5 (the physical numbering of the connectors) and FIG. 6 (the logical numbering of the connectors) may be complementary. In this case, a different numbering of the connectors will be adopted for the physical identification and the logical identification. For example, the connectors of FIG. 4 will be numbered A to E and the connector functions of FIG. 6 will be numbered 1 to 12.

Figure 7:
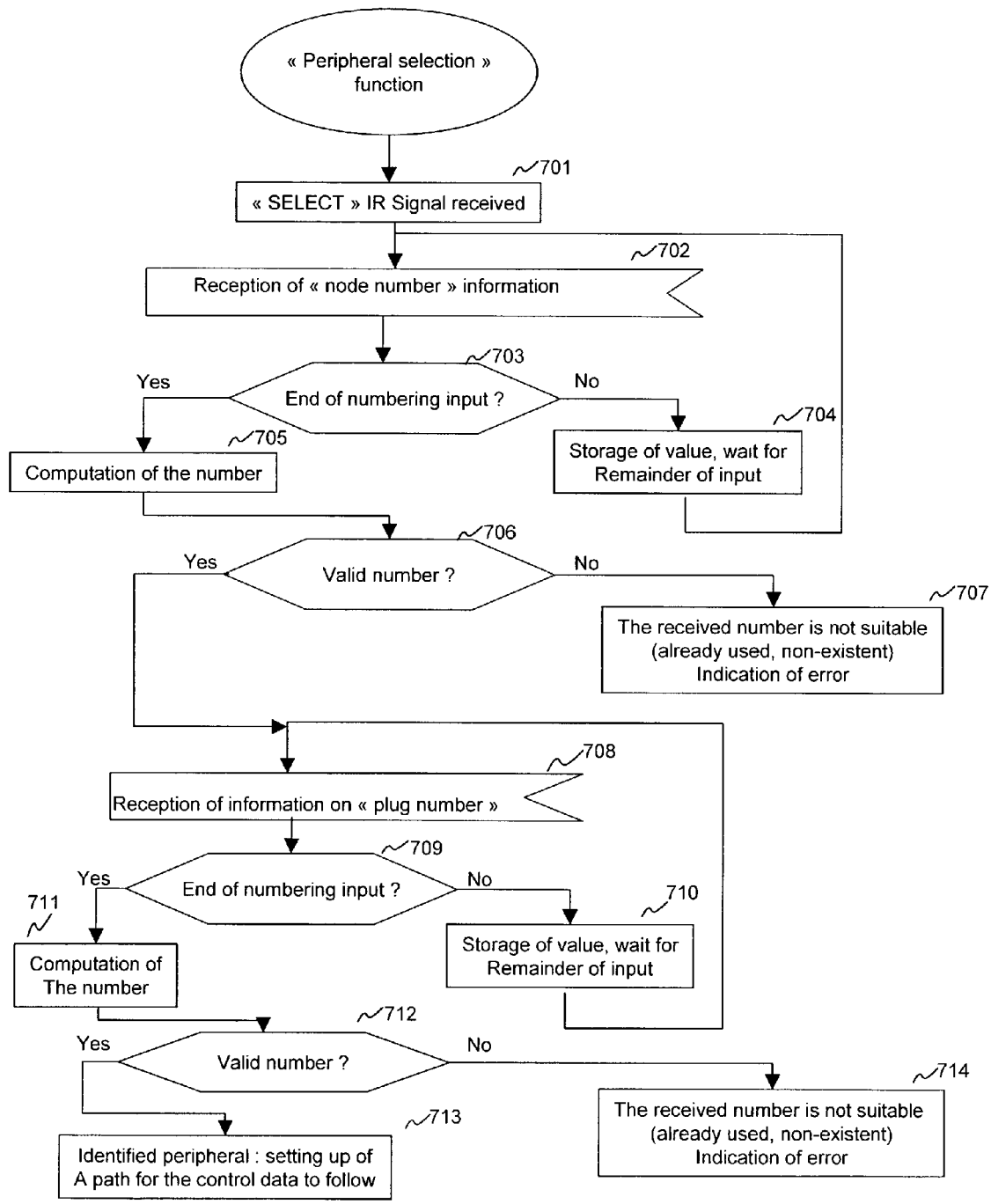
FIG. 7 illustrates a second exemplary function that can be implemented by the node of the network of FIG. 1 following the processing of FIG. 3, namely a function for the selection of a terminal of the network.

The unique identification of the terminals within the audiovisual network of the invention enables their selection by a user, as shown in FIG. 7. A terminal selection function of this kind can be implemented by a local node of the network upon reception of a specific infrared control signal at the end of the processing shown in FIG. 3.

The algorithm described with reference to FIG. 7 is stored in the ROM 94 associated with the switching device 90 of the local node. When the system is powered on, this algorithm is loaded into the RAM 95 and the microcontroller 93 will execute the corresponding instructions.

The "peripheral selection" function is a command specific to the nodes of the network, which shall hereinafter be called the "SELECT" function. Its aim is to make a unique selection of a terminal of the audiovisual network of the invention, so that a user can control this terminal (for example by sending it infrared signals of the second type) and set up a connection in order to transfer data between an item of source equipment and a destination terminal. For example, a user selects solely the television set 10 connected with the node referenced 2 of FIG. 1 so that it constitutes a destination terminal for the audiovisual signals coming from the video tape recorder 5 connected to the node referenced 1 of FIG. 1.

A user therefore sends infrared signals to the local node, by means of a remote control 14 indicating that he wishes to select a terminal of the network.

As described here above with reference to FIG. 3, upon reception of the infrared control "SELECT", the local node verifies its nature and then implements the processing described here above.

After receiving (701) the specific infrared signal "SELECT", the local node awaits the reception (702) of additional information, namely the number of the node of the network with which the terminal that the user wishes to select is connected (namely the number of the target node which may also be a string of alphanumerical characters or any other type of appropriate identifier).

When this information has been received, the local node verifies (703) whether it is complete or whether other information is still missing. For example, the local node ascertains that the number of the target node has been entirely entered by the user.

At the end of the test 703, if the local node is still awaiting information, it stores (704) the information already received into the RAM 95 and places itself in the state referenced 702 waiting for the reception of information.

If on the contrary, at the end of the test 703, the local node considers that it has received all the information necessary, it determines (705) the identification number of the target node as a function of the information received.

The local node then verifies the validity of the number determined during the step referenced 705. Indeed, it may be that the determined node corresponds to none of the node numbers of the network known to the local node and assigned by the user during the method of FIG. 4. In this case, if the number is not valid, the local node sends an error notification 707 so as to inform the user that there is a problem.

If the determined number is considered to be valid, the local node is in a state of waiting (708) for the reception of the identification number of the connector (physical as shown with reference to FIG. 5 or logical as illustrated with reference to FIG. 6) to which the terminal that the user wishes to select is connected.

After the reception of complementary data, the local node ascertains (709) that this data is completely or not complete. If the local node is still waiting for data, it memorizes (710) the data already received in the RAM 95 and goes back to the state referenced 708 waiting for reception of complementary data. Otherwise, the local node determines (711) the number of the connector to which the terminal to be selected is connected, as a function of the data received.

The local node then tests (712) the validity of the connector number that it has determined. Indeed, it may be the case that the connector number determined during this step referenced 711 corresponds to none of the connector numbers of the network of the invention. In this case, or if the number is not valid for any other reason, the local node sends (714) an error notification to the user so as to inform him of this dysfunction (by a sound signal, an error message on a screen, etc.).

If on the contrary the determined connector number is valid, the terminal that the user wishes to select is identified uniquely inside the network, from the number of the target node determined during the step referenced 705 and the connector number determined during the step referenced 711. The local node then (713) sets up a control path between the selected terminal (also called a target terminal) and the local node so that all the infrared signals received thereafter can be routed, if necessary, through the home audiovisual network of the invention up to the target terminal. The setting up of a control path of this kind may consist for example of a routing information contained in the header of the audiovisual signal packets, this routing information being used to attain the target terminal as described hereinafter with reference to FIG. 9.

Figure 8:
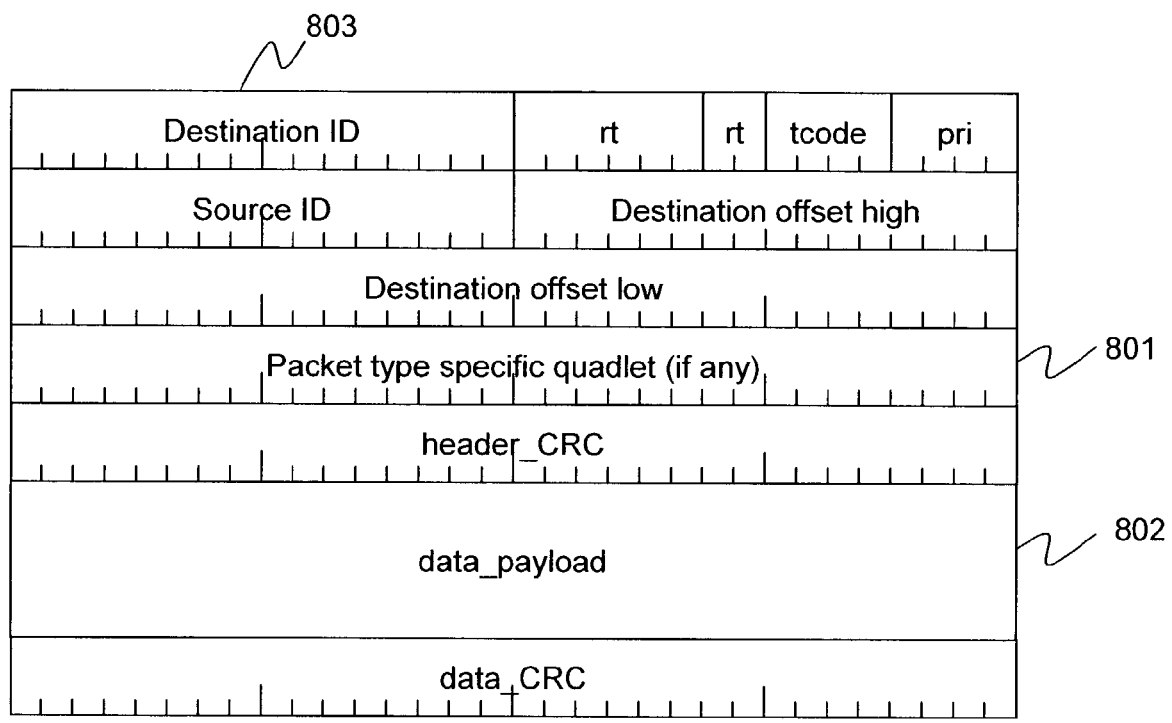
FIG. 8 describes a structure of a packet used for the transfer of infrared signals through the home audiovisual network of the invention.

FIG. 8 gives a more precise description of the structure of the asynchronous packets, used for the conveyance of infrared signals between the different pieces of equipment of the home audiovisual network of the invention.

A packet structure 801 of this kind complies with the standard "IEEE Std 1394-1995, Standard for a High Performance Serial Bus". It can be used especially to reach any node of the network even if it is located behind a 1394.1 bridge.

The infrared commands are conveyed in the data_payload field referenced 802.

In a particular embodiment of the invention, when a user sends remote control signals, known as second type signals, namely signals specific to a target terminal, to this terminal, the second remote control signals are conveyed from the local node to the target node in the form of packets 801. In particular, the identifier of the target node is conveyed in the Destination ID field 803 and the identifier of the connector to which the target terminal is connected is conveyed in the data_payload field 802.

With reference to FIG. 9, we shall now present information that has to be stored in the context of the invention to enable the routing of a packet through the home audiovisual network.

This information is stored in each of the nodes of the network in the form of a table 901 combining address and routing data specific to each of the nodes of the network.

Thus, the single identifiers assigned by the user to each of the nodes during the process of FIG. 4 are stored in the field referenced 903 called "unique logical Id". These "unique logical Ids" 903 are stored, in connection with the field referenced 904 described hereinafter, in the flash memory 86 so as to last beyond any powering-off of the network.

Furthermore, a network identifier, which hereinafter shall be called a "unique network Id" 904 is made to correspond to each of these "unique logical Ids" 903. This identifier 904 is determined in the course of a mechanism for updating the topology of the network which is not the object of the present invention and is therefore not described in detail. For example, this identifier 904 could be based on the value encoded on 64 bits of the EUI-64 laid down by the IEEE 1394 standard.

After a "unique logical Id" 903 has been assigned to a node of the network, this identifier has to be communicated to all the other nodes of the network by using, for example, a message broadcasting mechanism so that each of the nodes of the network can update its table 901.

According to the known techniques of message broadcasting, acknowledgment messages are not generally used for the positive or negative acknowledgment of data reception. In one variant of the invention, it is therefore possible to envisage the choice of a particular node of the network, called a leader node, during the mechanism for updating the topology of the network (which is not the object of the present invention) that is responsible for allocating "unique network Ids" 904.

With respect to the node addressing method, each node of the network of the invention is seen as a 1394 type node and is therefore assigned a corresponding "1394 address" 902. The node_id field of such an address 902 encoded on 6 bits may be for example the "unique logical Id" 903 or it may be determined from the "unique network Id" 904.

The use of 1394 type packets advantageously makes it possible to extend the field of the present invention to the nodes of the network located behind a bridge 1394.1.

The broadcast message mentioned here above may thus be propagated through the home audiovisual network of the invention and reach the leader node, where it is located (in the particular variant of the invention implementing a leader node of this kind).

The table 901 also comprises a routing information 905 necessary to convey a packet through the home audiovisual network from a first node to a second node. For example, in a preferred embodiment of the invention implementing a switched home audiovisual network, a routing information 905 of this kind is a source routing header.

The mechanism for updating the topology of the network updates the table 901 after any change in the topology of the network.

An asynchronous packet used to convey digitized infrared signals between the nodes is routed within the home network as a function of the appropriate source routing header of the table 901.

Figure 10:
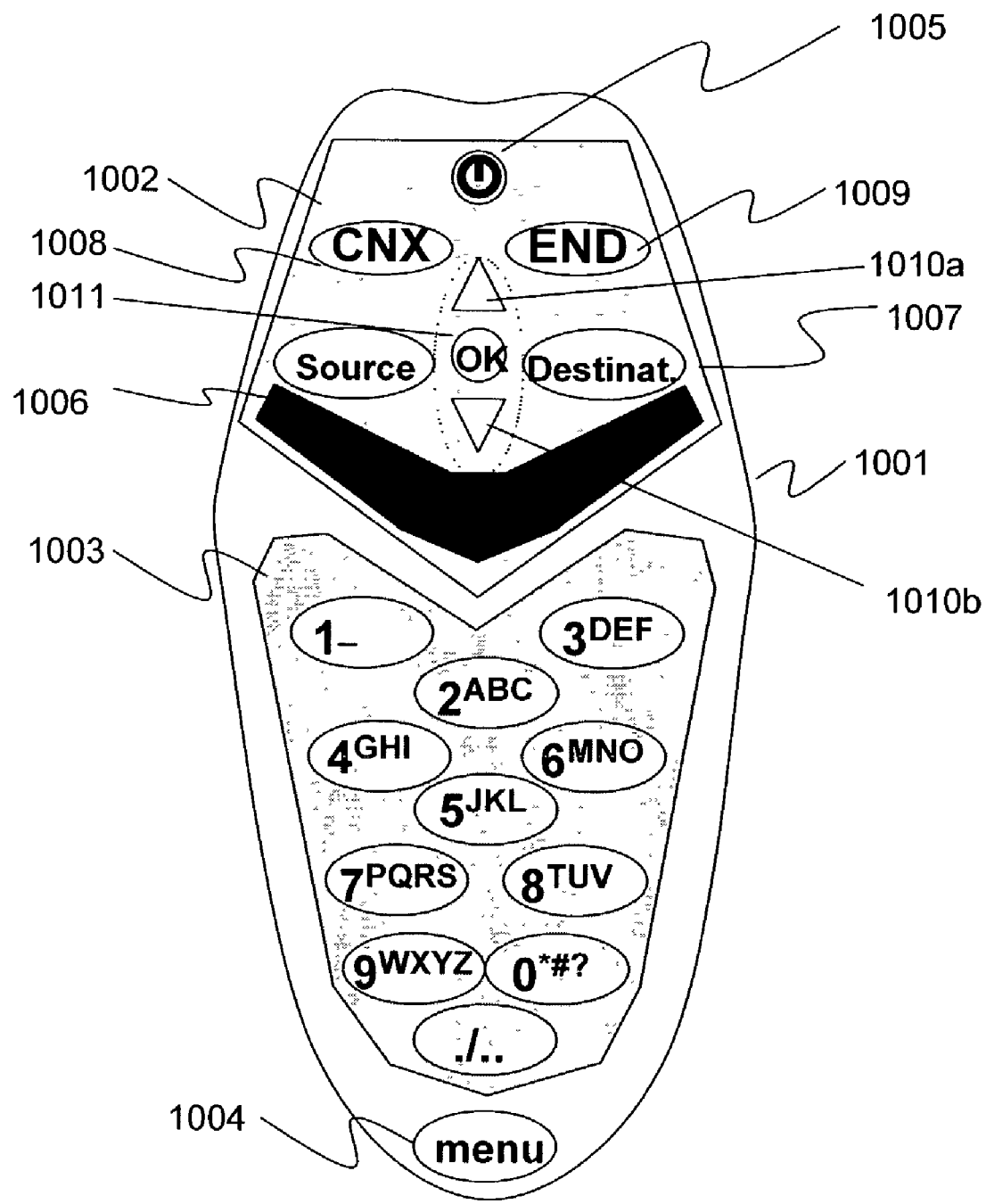
FIG. 10 shows an exemplary remote control implemented in a particular embodiment of the invention.

Hereinafter, a remote control 1001 is described with reference to FIG. 10. This remote control is used in the context of the invention to enable a user to generate infrared commands specific to the nodes of the network.

A remote control 1001 of this kind can furthermore emulate at least some of the functions associated with a legacy remote control pack associated with an analog terminal (for example an infrared remote control of a television set or a video tape recorder).

A pack 1001 of this kind comprises for example three sets of keys:
  a first set of keys referenced 1002 comprising specific control keys;
  a second set of alphanumerical keys referenced 1003;
  a key referenced 1004 enabling a user to access a menu, for example a menu of complementary functionalities that could be implemented within the audiovisual network of the invention but shall not be described in greater detail in the context of the present patent application.

The set of control keys referenced 1002 comprises for example:
  a button referenced 1005 used to control the standby or "resume activity" state of the node of the audiovisual network associated with the remote control pack 1001;
  two keys; a "Source" key referenced 1006 and a "Destination" key referenced 1007, by which a particular terminal of the audiovisual network can be selected. The "Source" key referenced 1006 enables the user to select a transmitter device (namely a source node or an input terminal also called a "talker") of the audiovisual network of the invention according to the "SELECT" function described here above associated with a transmitter equipment. The "Destination" key referenced 1007 enables a user to select a destination terminal of the audiovisual network of the invention, for example the television set referenced 6 of FIG. 1 according to the "SELECT" function described here above associated with a destination terminal;
  a connection key "CNX" referenced 1008 used to set up a connection between the transmitter equipment and the destination terminal selected by means of buttons referenced 1006 and 1007 described here above;
  an "END" button referenced 1009 that can put an end to any specific processing performed by the local node controlled by the remote control pack 1001;
  up and down navigation buttons respectively referenced 1010a and 1010b enabling the user to move up or down in a menu or a list;
  an "OK" button referenced 1011 used to validate the selection of an item of a list or a menu. The "OK" button 1011 may also be used for validation at the end of the entry of an identification number of a node or a terminal.

The alphanumerical keys of the set referenced 1003 enable a user to select an item referenced by means of an alphanumerical character within a list or a menu or again to enter a string of alphanumerical characters by means of a remote control 1001, for example when a unique identification number is assigned to a node of the network, as shown in FIG. 4.

A description is given here below, with reference to FIG. 11, of the different steps implemented by a local node during the learning of the remote control signals coming from the second remote control 15.

Figure 11:
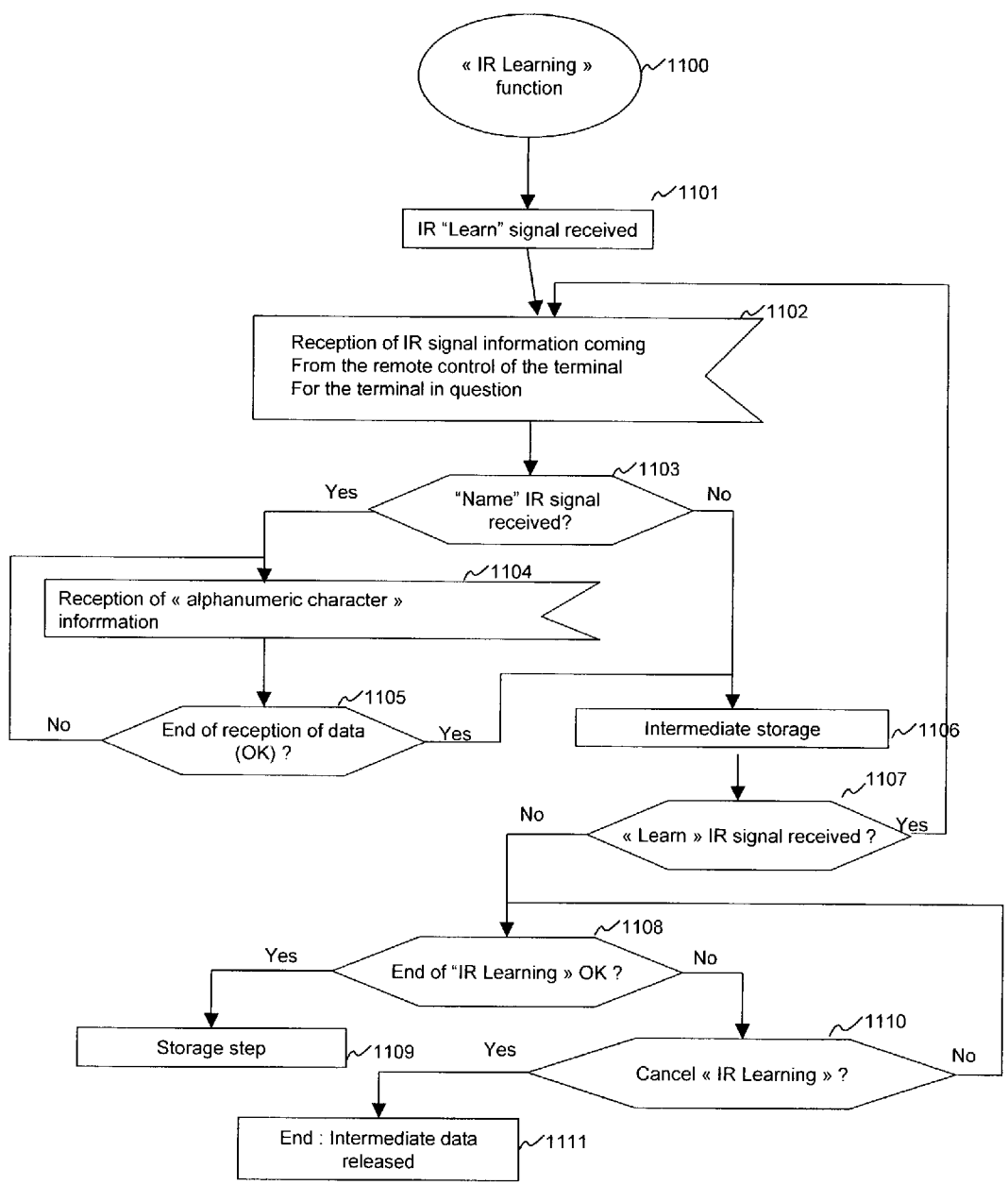
FIG. 11 illustrates the different steps implemented by a local node of the network of FIG. 1 during a phase for the learning of second remote control signals.

The algorithm described with reference to FIG. 11 is stored in the ROM 94 associated with the switching device 90 of the local node. When the system is powered on, this algorithm is loaded into the RAM 95 and the microcontroller 93 will execute the corresponding instructions.

The learning function described with reference to FIG. 11 is a function specific to the nodes of the network, enabling the network to learn second remote control signals sent by a remote control pack specific to a terminal and, if necessary, a name or an identifier associated by a user with the learned remote control signal.

A user who wishes to activate the learning mode 1100 for learning remote control signals by the network uses the first remote control pack referenced 14 to send a remote control signal "LEARN" 1101 to the local node at which it is located. This signal "LEARN" can be generated in different ways, either directly by pressing a dedicated key of the remote control or indirectly by accessing a menu displayed on the screen associated with the local node after pressing the "MENU" key of the remote control as described in greater detail above with reference to FIG. 10. As a preliminary, the user selects the terminal of the network for which he wishes to effect a learning of infrared signals according to a technique which shall be described in greater detail above with reference to FIG. 7.

The user then activates one of the keys of the remote control pack 15 associated with the selected terminal. For example, if the selected terminal is a video tape recorder, the user presses the "PLAY" key of the remote control of the video tape recorder. The local node receives (1102) the infrared signal coming from the remote control 15 corresponding to the function "PLAY". At reception, the infrared signal is digitized by means of analog/digital conversion means.

The local node then carries out a test, during a step referenced 1103, to find out whether or not it has received a "NAME" type infrared signal coming from the remote control pack referenced 14 indicating that the user wishes to assign a name or an identifier to the signal "PLAY" in the course of learning.

If the answer is affirmative, the local node goes into a waiting state 1104 of waiting for identification information of the signal "PLAY". For example, the local node awaits the reception, from the remote control pack referenced 14, of a string of alphanumerical characters entered by the user.

It is also possible, upon reception of a remote control signal "NAME", to envisage a case where the local node proposes one or more identifiers of the signal to the user who makes a choice of the identifiers from among a list of identifiers. For example, the local node displays, on the screen associated with it, a list of names that could be assigned by default to the signal that is being learned:
  "PLAY";
  "STOP";
  "FAST FORWARD";

The local node then performs a test 1105 pertaining to the end of reception of identification data. In a preferred embodiment of the invention, the local node ascertains that the user has properly confirmed the entry of alphanumeric character strings performed by pressing a key "OK" of the remote control pack 14.

If the local node is still waiting for identification data (the user has not yet keyed-in the name or the number of the signal being learned or has not pressed "OK" at the end of the operation), it returns to the stage referenced 1104 of waiting for information.

Otherwise, the identifier of the signal learnt has been entirely entered and the local node operates an intermediate storage 1106 of the learned signal and of the identifier that is associated with it in a temporary storage means of the local node.

If, during the test referenced 1103, the local node determines that no "NAME" signal has been received (the user does not wish to assign any identifier to the signal being learned by the network), it carries out an intermediate storage 1106 of the learned signal. It is possible, for example, to envisage that the local node in this case will itself assign an identifier to the learned signal.

At the end of the storage 1106, the local node verifies (1107) the reception of a new signal "LEARN" which will come from the remote control 14 if the user wishes to continue the learning of the remote control signal. For example, the user could send a new "LEARN" signal in order also to memorize the signal associated with the "STOP" function of the video tape recorder within the network.

If the local node determines that a new "LEARN" signal has been sent, it repeats the operations referenced 1102 to 1106 described here above.

Otherwise, the local node (1108) determines whether the learning phase activated by the user is over. For example, the local node ascertains that it has truly received a confirmation signal "OK" coming from the remote control referenced 14.

If the answer is yes, the local node launches a step of storage of the learned remote control signal or signals which shall be described in greater detail with reference to FIG. 12.

If the answer is negative, the local node makes a test (1110) to find out if it has received a command from the user for cancelling the learning operation performed, by means of a specific remote control signal coming from the remote control referenced 14. Indeed, the user, for example after having noted a handling error, may wish to cancel the previous operations referenced 1101 to 1107.

If the local node has not received any learning cancellation command, it must repeat the end of learning test 1108.

If not, the local node releases 1111 the data stored during the intermediate storage step 1106. It is possible to envisage a first alternative embodiment of the invention in which only the last remote control signal stored (1106) is erased from the temporarily storage means of the local node. It is also possible to envisage a second alternative embodiment of the invention, in which all the signals temporarily stored by the local node from the beginning of the learning phase 1100 are cancelled.

Figure 12:
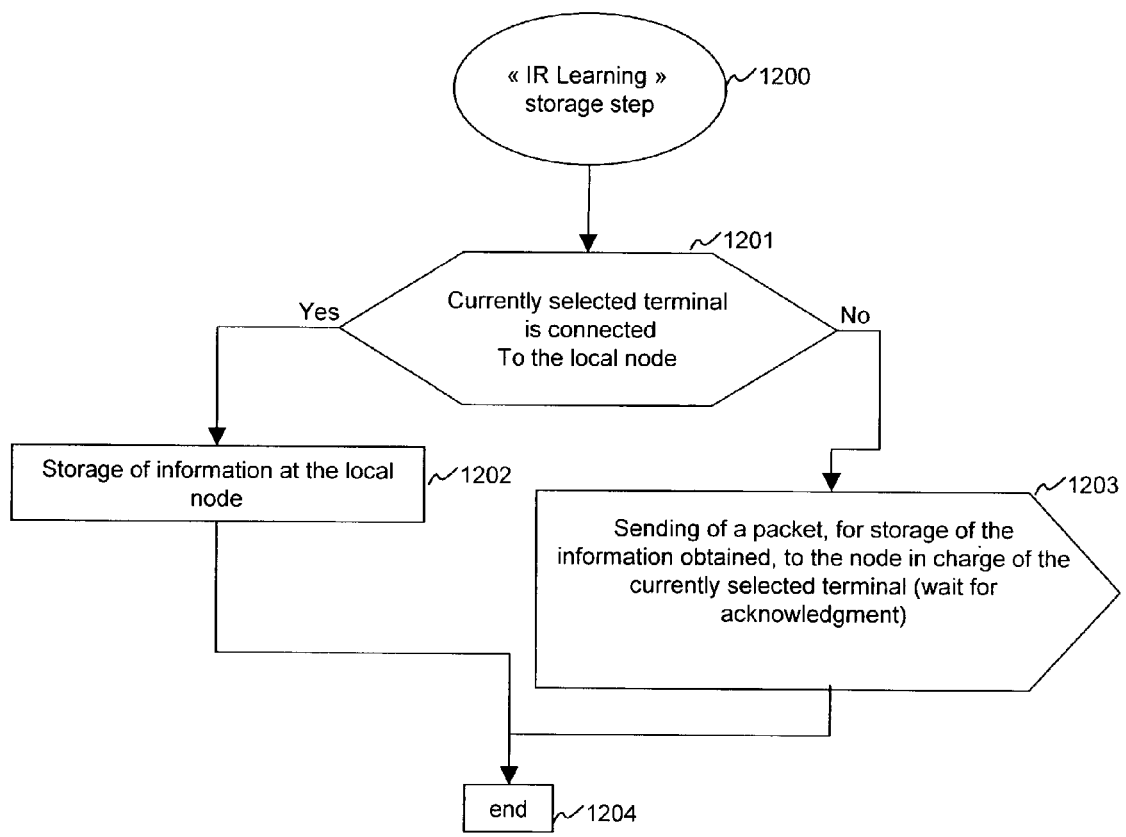
FIG. 12 is a block diagram of the different steps implemented during the storage of the second remote control signals that have been the object of the learning process of FIG. 11.

FIG. 12 gives a more precise description of the step 1109 for the storage of the remote control signals that are the object of the learning operation of FIG. 11.

The algorithm described with reference to FIG. 12 is stored in the ROM 94 associated with the switching device 90 of the local node. When the system is powered on, this algorithm is loaded into the RAM 95 and the microcontroller 93 will execute the corresponding instructions.

A function such as this for the permanent storage 1200 of the second remote control signals and, as the case may be, of the name that is associated with them is aimed at storing the learned signals in the node of the network with which the terminal, selected by the user prior to the learning phase, is connected.

The local node carries out a test 1201 to determine whether the terminal selected by the user, whose remote control signals have been temporarily stored, is connected to the local node or to a remote node of the network.

If the selected terminal is connected to the local node, this local node carries out a permanent storage 1202 of information temporarily stored during the step referenced 1106 of FIG. 11. Information of this kind (namely the second remote control signal in digitized form, and the name that may possibly have been associated with it by a user or, by default, by the local node) are preferably stored in a permanent storage means such as the flash memory 86 of the local node so as to be saved even if the node of the invention is powered off.

Thus, the second remote control signals specific to the selected terminal may be called out of the flash memory 86 and reutilized if need be when the terminal is again selected by a user (in the context of a connection between an input terminal or "talker" and a destination terminal or "listener" for example).

By contrast, if the local node determines that the selection terminal is connected to a distant node of the network (for example located in a neighboring room of the dwelling), it sends (1203) a packet to this distant node in which the digitized signal to be stored and possibly its name are conveyed so that the remote node can store this information in a permanent storage means (such as its flash memory) according to a process similar to the one described for the local node during the step referenced 1202.

A packet of this kind may, for example, convey a table of several elements of infrared commands, each of the elements of infrared commands of the table describing at least one learned digitized infrared signal, the corresponding name (if such a name or identifier exists) and complementary management data (for example an index, etc.) used by the remote node for the processing of the infrared commands.

The address of the remote node to which a packet of this kind is sent is obtained according to a technique which is described in greater detail above with reference to FIG. 9. The structure of a packet of this kind is also described above with reference to FIG. 8.

In one alternative embodiment of the invention, the local node waits for an acknowledgment from the remote node indicating that the latter has properly received the sent packet.

In the case of positive acknowledgment, or after storage of the signals learned by the local node, the local node puts an end (1204) to the procedure of permanent storage of the infrared learning.

The second remote control signal stored by the local node or by the remote node can result from a processing of the second "original" remote control signal (namely the remote control signal sent by the second remote control pack specific to the terminal) and therefore may be not strictly identical to this "original" signal.

As an option, the step referenced 1203 of FIG. 12 may also be implemented from a first node to a second node, when a terminal initially connected to the first node is shifted to be connected to the second node.

Here below, a description is given with reference to FIG. 13 of the different steps implemented by the local node during a phase of utilization of the remote control signals specific to the terminals learned and memorized during the step of FIGS. 11 and 12.

Figure 13:
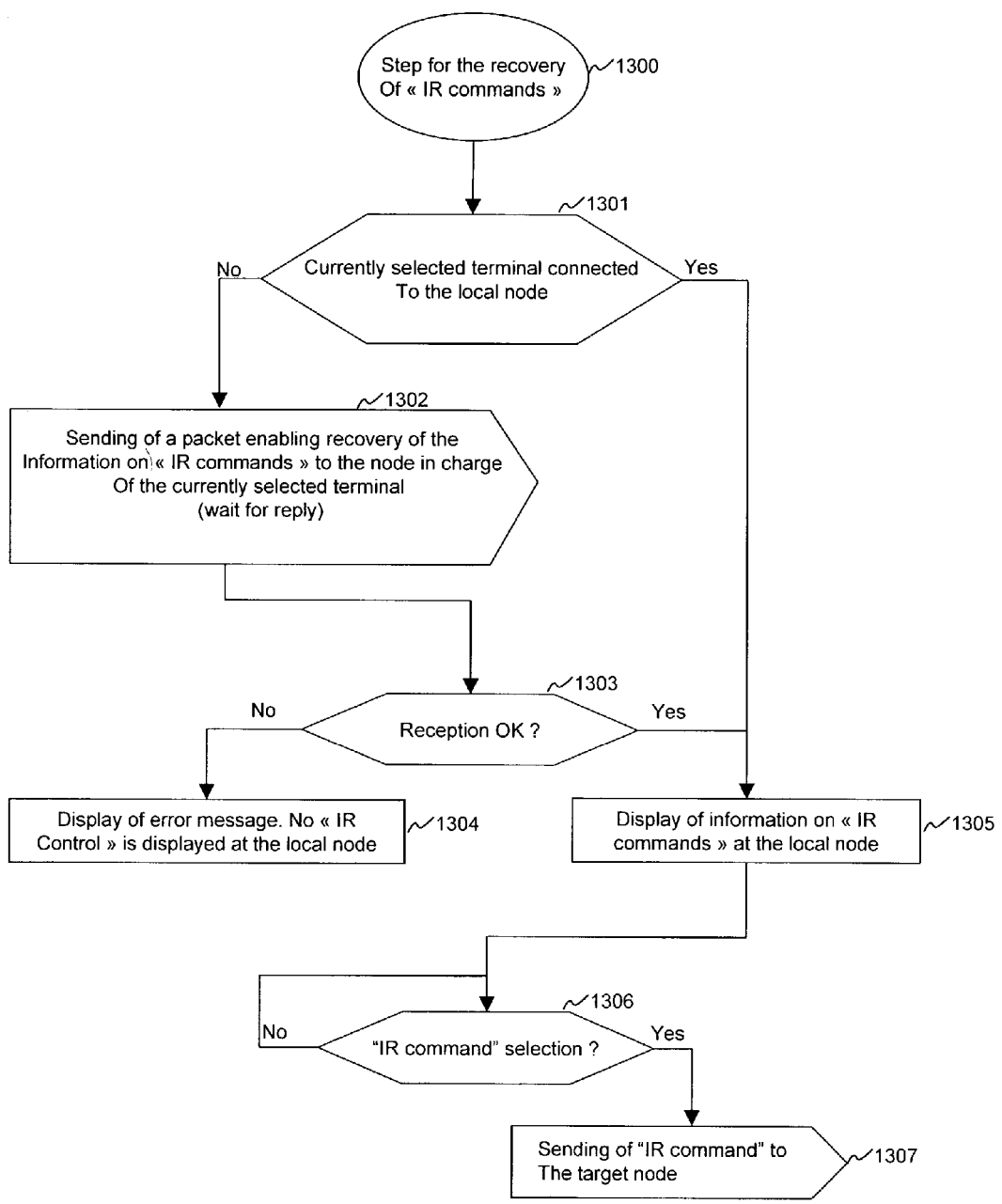
FIG. 13 illustrates the different steps implemented by a local node during the phase of utilization of the second learned remote control signals.

The algorithm described with reference to FIG. 13 is stored in the ROM 94 associated with the switching device 90 of the local node. During the powering-on, this algorithm is loaded into the RAM 95 and the microcontroller 93 will carry out the corresponding instructions.

A user selects a terminal of the network according to the process described above with reference to FIG. 7. For example, the user has set up a connection between the television set of his bedroom and a video tape recorder located in his living room and wishes to select the video tape recorder to send it stopping and rewinding commands.

Since the remote control signals associated with the video tape recorder have undergone preliminary learning, as described with reference to FIGS. 11 and 12, the user can use the remote control specific to the nodes of the network 14 to activate the routing of the stopping and rewinding commands to the selected video tape recorder.

The function described with reference to FIG. 13 is a function, specific to the nodes, for the recovery 1300 of the infrared control signals that are the object of a preliminary learning and storage process within the home audiovisual network of the invention.

The user, by means of the remote control referenced 14, sends the local node an infrared signal indicating that he wishes to send a command to the selected terminal and therefore recover the list of the commands associated with this terminal and stored within the network.

In a preferred embodiment of the invention, as soon as a terminal is selected by the user, the list of associated infrared commands is automatically displayed if such commands have been stored during a learning phase.

During a step referenced 1301, the local node tests to see if the selected terminal is connected to it or is connected to a remote node of the network.

If the selected terminal is connected to the local node (typically the video tape recorder selected by the user is in the same room as this local node, if a node of the network is associated with each of the rooms of the dwelling), the local node extracts all the commands stored in its flash memory 86 associated with a selected terminal and displays them (1305) on a screen that is associated with it so that they can be made consultable by the user.

If the terminal is connected with a remote node (also called a target node) of the network, the local node sends (1302) a packet to the remote node containing a request for the recovery of the infrared commands that are associated with a terminal and have undergone a preliminary learning operation.

In a preferred alternative embodiment of the invention, the local node awaits a response of the remote node.

The local node carries out a test (1303) to ascertain that it has correctly received the control signals associated with the selected terminal and stored in the remote node, coming from the latter.

If test is affirmative, it displays (1305) the list of infrared commands accessible to the user for the selected terminal as described here above.

If the test is negative, the local node displays an error message 1304 on a screen associated with it so as to inform the user that a dysfunction has occurred or that, for example, no infrared command associated with the selected terminal has been memorized within the network (for example no learning phase has been implemented for this terminal).

After displaying (1305) a list of commands of the terminal accessible to the user, the local node carries out a test (1306) to find out if one of these infrared commands has been selected by the user. A selection of this kind may result from a navigation of the user within the list, by means of navigation arrows of the remote control which is described above with reference to FIG. 10 and a selection of one of the items of this list, for example by pressing a validation key "OK". It can also result from the entry by the user of a number of the item of the list that he wishes to select.

It will be noted that such a selection enables the user to choose an infrared command intended for the selected terminal without having to use the remote control pack specific to the terminal.

If the result of the test is negative, the local node repeats the test 1306 until an infrared command has been chosen by the user.

In the result is affirmative, the local node (1307) sends a specific packet to the remote node containing an identification data of the infrared command selected by the user.

The remote node, on reception of the specific packet, then generates the corresponding command and conveys it up to the selected terminal. In a first alternative embodiment of the invention, the remote node generates an infrared signal from the specific packet received from the local node and transmits this infrared signal to the selected terminal. In a second variant of the invention, the command is conveyed up to the selected terminal in digitized form within packets whose structure is described with reference to FIG. 8.

Thus, the user makes use of the remote control pack 14 specific to the nodes of the network to select one or more infrared commands associated with a selected terminal. Upon reception of specific packets containing an identifier of the infrared command or commands coming from the local node, the (target) node of the network with which the terminal is connected generates the "true" infrared signal (namely the one that would have been sent by the remote control pack 15 specific to the selected terminal). This true infrared signal is extracted from the permanent storage means of the remote node as a function of the information, conveyed by the specific packet, for the identification of the infrared command.

To be able to implement the phase for the learning of remote control signals and the phase for the use of the learned remote control signals described with reference to FIGS. 11 to 13, it is necessary first of all that a user should select a terminal of the network of the invention (see FIG. 7). A selection of this kind however is possible only if each of the terminals of the network can be identified uniquely and permanently within the network.

What is claimed is:

1. A method for the processing signals from a remote control device within a home audiovisual network comprising a plurality of nodes for interconnecting a plurality of terminals, wherein, within the network, at least the following two types of remote-control signals are used:

first type remote-control signals specific to the nodes and sent by at least one first remote control device associated with the nodes; and second type remote-control signals specific to the terminals and sent by at least one second remote control device associated with at least one of said terminals; and wherein each node of the network, called a local node, when receiving a first remote-control signal, performs the following steps:

analysis of a type of the received first remote-control signal;

if the type of the received first remote-control signal is determined to be one of the first type remote-control signals, processing the signal and performing at least one function in response to the received first remote-control signal;

if the type of the received first remote-control signal is determined to be one of the second type remote-control signals, transparently sending said received second type remote-control signal to a target node if the target node, to which a target terminal is connected, has been determined beforehand, said received second type remote-control signal being re-transmitted by said target node to said target terminal, said target terminal being connected with said target node, through at least one predetermined link which is a same type of link as a link existing between said at least one second remote control device and said target terminal, the target node emulating at least one function of said at least one second remote control device so that it can retransmit said received second type remote-control signal; and if no target node has been determined beforehand, ignoring said received second type remote-control signal.

2. A method according to claim 1 wherein, when the received first remote-control signal is one of the first type remote-control signals, the local node awaits the reception and processing of at least one other remote-control signal to carry out said at least one function.

3. A method according to claim 2, wherein said at least one other remote-control signal belongs to the group comprising said first type and said second type remote-control signals.

4. A method according to claim 1, wherein said at least one predetermined link through which the target terminal is connected with the target node is a cordless link.

5. A method according to claim 1, wherein said at least one predetermined link between the target node and the target terminal is borne by a medium that connects the target terminal to the target node, as a medium for connecting the target terminal to the home audiovisual network.

6. A method according to claim 5, wherein said target terminal is a digital type of target terminal and said at least one predetermined link between the target node and the target terminal is borne by a digital bus of the IEEE 1394 type, as a medium for connecting the target terminal to the home audiovisual network.

7. A method according to claim 5, wherein, between the target node and the target terminal, the second type remote-control signal is conveyed in at least one first packet comprising:

a header containing a piece of information on the target terminal; and a data field containing at least one part of the second type remote-control signal.

8. A method according to claim 1, wherein, when the local node transparently transmits the second type remote-control signal to the target node, the second type remote-control signal is conveyed, between the local node and the target node, in at least one second packet comprising:

a header containing a piece of information on the target node; and a data field containing at least one part of the second remote control signal.

9. A method according to claim 1, wherein said function performed by the local node after the processing of a first type remote-control signal is a function for the identification of a piece of equipment of said network.

10. A method according to claim 9, wherein said function for the identification of the piece of equipment of said network allows assignment of a unique identifier to a node, called an identified node, to which at least one of said terminals can be connected, and wherein said unique identifier is conveyed by a remote-control signal.

11. A method according to claim 10, wherein, by default, said identified node is said local node.

12. A method according to claim 10, wherein the unique identifier for said identified node is stored in said local node.

13. A method according to claim 10, wherein the performing of said function for the identification of the piece of equipment of said network by said local node comprises a step during which said local node sends at least certain of the other nodes the unique identifier of said identified node.

14. A method according to claim 13, wherein, when said piece of equipment of said network is a terminal, the performing of said function for the identification of the terminal by said local node comprises:

said local node sends at least certain of the other nodes an identifier of a group of connection plugs comprising one or more connection plugs included in said identified node and through which one of said terminals may be connected to said identified node, so that each terminal is identified firstly by the identifier of the node with which it is connected and secondly by the identifier of the group of connection plugs through which it is connected to said node.

15. A method according to claim 14, wherein said group of connection plugs are defined so as to assemble, within one and the same group, neighboring connection plugs in said identified node.

16. A method according to claim 14, wherein, for at least certain of said identified nodes, said group of connection plugs are defined so as to functionally assemble, within one and the same group, all the connection plugs needed for the connection of one of said terminals to said identified node.

17. A method according to claim 16, wherein said group of connection plugs are defined, for a given node, according to a hierarchical structure, at least one of said groups including at least one other group of connection plugs of said node.

18. A method according to claim 10, wherein the performing of said function for the identification of the piece of equipment of said network by said local node comprises a step for verifying an identifier given by a user via the first remote control signal, so that said local node validates the supply of said unique identifier for said identified node, if said identifier given by the user verifies at least one predetermined condition.

19. A method according to claim 18, wherein, if the result of said verification step is positive, said identified node is stored in said local node.

20. A method according to claim 1, wherein said function, performed by the local node after the processing of the first remote-control signal is a function for the selection of a piece of equipment of the network.

21. A method according to claim 20, wherein said selection function belongs to the group comprising:
functions for the selection of a source node;
functions for the selection of an input node;
functions for the selection of an input terminal;
functions for the selection of a destination node; and
functions for the selection of destination terminal.

22. A method according to claim 20, wherein said function for the selection of the piece of equipment of said network comprises a selection step during which said user indicates firstly the identifier of a target node to which said terminal is connected and, secondly, the identifier of a group of connection plugs through which said terminal is connected to said target node so as to select said terminal.

23. A method according to claim 22, wherein said selection step is carried out:
a first time for selection of a destination terminal; and
a second time for selection of an input terminal, so as to set up the launching of a connection between said destination terminal and said input terminal for the transmission of audiovisual signals from said input terminal to said destination terminal.

24. A method according to claim 1, wherein said function, performed by the local node after the processing of the first remote-control signal, and after the processing of at least one second remote-control signal, is a function, called learning function, for the network to learn at least one second remote-control signal.

25. A method according to claim 24, wherein said learning function is implemented according to the following successive steps:
1) with a first remote control device, a user sends at least one first specific remote-control signal to said local node, known as a first launching remote-control signal;
2) after reception of said first launching remote-control signal, the local node goes into learning mode;
3) with a second remote-control device, said user sends said local node at least one second remote-control signal; and
4) after reception, the local node stores said at least one second remote-control signal, after having made it undergo a predetermined processing operation, in the form of at least one second learned remote-control signal.

26. A method according to claim 25, wherein the implementation of said learning function furthermore comprises the following step, preceding said step 1):
the selection by the user of a target terminal designed to be controlled by said second learned remote-control signal.

27. A method according to claim 25, wherein the implementation of said learning function furthermore comprises the following step, after the said step 2) and prior to step 3):
the assigning, by the user, of an identifier to said second learned remote-control signal, designed to be stored with said second learned remote-control signal, during the step 4).

28. A method according to claim 25, wherein said learning phase furthermore comprises the following steps, after the step 4):
5) transmission of said at least one learned remote-control signal, assigned to this remote-control signal, from the local node to the target node to which the target terminal is connected; and
6) storage in the target node of said learned remote-control signal.

29. A method according to claim 24, wherein said function performed by the local node after the processing of the first remote-control signal, belongs to the group comprising:
adding functions used to add a learned remote-control signal;
modification functions used to modify a learned remote-control signal; and
cancel functions used to eliminate a learned remote-control signal.

30. A method according to claim 24, wherein the first remote-control signal is a specific-selection remote-control signal and said predetermined function, performed by the local node after the processing of the specific selection remote-control signal is a function for the selection of at least one learned remote-control signal, and activation of the routing of said learned remote-control signal, from a target node to a target terminal, said target terminal being connected to said target node.

31. A method according to claim 30, wherein said function for the selection of at least one learned remote-control signal is a direct selection function, performed by the local node after the processing of a direct selection signal by which the user directly identifies said learned remote-control signal that the user intends to select.

32. A method according to claim 30, wherein said function for the selection of at least one learned remote-control signal is an indirect-selection function, according to which the local node performs the following step:
recovery by the local node of a list of learned remote-control signals pertaining to the target terminal; and said indirect-selection function is performed by the local node after the processing of the indirect-selection signal by which the user indirectly, by a choice in this list, identifies said learned remote-control signal that the user intends to select.

33. A method according to claim 32, wherein said recovery step comprises the following steps:
the local node sends the target node a request for information on the target terminal; and
in response to said request for information, the target node sends the local node a list of identifiers of learned remote-control signals stored by the target node and pertaining to the target terminal.

34. A method according to claim 30, wherein, when performing said function for the selection of at least one learned remote-control signal, the local node also performs the following steps:
after the reception of said first selection remote-control signal, the local node sends the target node a message for activating the routing of at least one selected learned remote-control signal; and
after the reception of said routing activation message, the target node recovers and sends the target terminal, through at least one predetermined link between the target node and the target terminal, said learned remote-control signal selected by the user.

35. A method according to claim 1, wherein said function performed by the local node after the processing of the first remote-control signal belongs to the group comprising:
connection functions used to set up a connection between two pieces of equipment of the network selected beforehand; and
disconnection functions by which a previously set-up connection can be ended.

36. A method according to claim 1, wherein said home audiovisual network is a switched type of network.

37. A method according to claim 1, wherein said first and second remote-control signals are signals belonging to the group comprising:
infrared remote-control signals; and
high frequency remote-control signals.

38. A method according to claim 1, wherein said first remote-control device emulates at least one function of said second remote control device so as to be able to send at least certain of the second remote-control signals.

39. A device contained in a home audiovisual network comprising a plurality of nodes for interconnecting a plurality of terminals,
wherein, at least the two following types of remote-control signals are used within said network:
first type remote-control signals specific to the nodes and transmitted by at least one first remote control device associated with the nodes; and
second type remote-control signals, specific to the terminals and transmitted by at least one second remote control device associated with at least one of said terminals;
wherein said device comprises:
a receiver to receive a first remote-control signal;
a controller to analyze a type of remote-control signal received by the receiver;
a processor to process and perform at least one function that is activated if the remote-control signal received by the receiver is one of the first type remote-control signals; and
a transmitter to transparently transmit said remote-control signal received by the receiver to a target node:
wherein said transmitter is activated if the remote-control signal received by the receiver is one of the second type remote control signals and if said target node, to which a target terminal is connected, has been determined beforehand, said received second type remote-control signal being re-transmitted by said target node to said target terminal, said target terminal being connected with said target node, through at least one predetermined link which is a same type of link as a link existing between said at least one second remote control device and said target terminal, the target node emulating at least one function of said at least one second remote control device so that it can retransmit said received second type remote-control signal, and
wherein said transmitter is not activated if the remote-control signal received by the receiver is one of the second type remote-control signals and if no target node has been determined beforehand.

40. A device according to claim 39, further comprising a second controller by which a user can assign a unique identifier to any node of the network and to which it is possible to connect at least one target terminal, said unique identifier being supplied through an interface included in a local node of the network.

41. A device according to claim 39, further comprising:
a second receiver to receive at least one first launching remote-control signal, sent by the user with a first remote control device;
a second controller to switch into a learning mode when said second receiver receives said at least one first launching remote-control signal;
a third receiver to receive, in said learning mode, at least one second remote-control signal sent by the user with a second remote control device;
a storage device to store, in said learning mode, at least one second received remote-control signal in the form of at least one learned remote-control signal;
a fourth receiver to receive at least one first remote-control signal for the selection of said at least one learned remote-control signal, sent by the user with the first remote control device;
a third controller to switch into a utilization mode, activated when said fourth receiver receives said at least one first selection remote-control signal; and
a fifth controller to activate, in said utilization mode, the routing of said at least one learned remote-control signal from said target node to said target terminal.

42. A device included in a home audiovisual network comprising a plurality of nodes used to interconnect a plurality of terminals,
wherein, at least two of the following types of remote-control signals are used within said network;
first type remote-control signals specific to the nodes and transmitted by at least one first remote control associated with the nodes; and
second type remote-control signals, specific to the terminals and transmitted by at least one second remote control associated with at least one of said terminals;
wherein said device comprises:
a first receiver to receive at least one of said second type remote-control signals transmitted transparently by a node of the network, called a local node;
a first transmitter to retransmit said second type remote-control signal to a target terminal, the target terminal being connected to the device through at least one predetermined link which is a same type of link as a link existing between said at least one second remote control device and the target terminal, the target node emulating at least one function of said at least one second remote control device so that it can retransmit said received second type remote-control signals;
a second receiver to route an activation message, sent by the local node and indicating at least one learned remote-control signal that has been selected by a user;
a controller to recover, within the network, said learned remote-control signal that has been selected by the user; and
a second transmitter to transmit, to the target terminal, through at least one predetermined link between said device and the target terminal, said learned remote-control signal after it has been recovered by the controller.

43. A computer-readable storage medium storing a computer program, which computer program comprises instruction sequences that, when executed by a computer, implement the method according to one of the claim 1 to 8 and 9 to 38.

44. A computer-readable storage medium on which is stored encoded a computer executable program that, when executed by a computer, performs processing of remote-control signals within a home audiovisual network comprising a plurality of nodes for interconnecting a plurality of terminals, wherein at least the following two types of remote-control signals are used within said network:

first type remote-control signals specific to the nodes and sent by at least one first remote control device associated with the nodes; and second type remote-control signals specific to the terminals and sent by at least one second remote control device associated with at least one of said terminals;

said computer executable program comprising program code instructions to execute the steps of:

analysis of a type of remote-control signal received by a local node of the network;

processing and implementation of a function if the received remote-control signal is one of the first type remote-control signals;

transparent transmission of said received signal to a target node to which a target terminal is connected, if the received remote-control signal is one of the second type remote-control signals, and if said target node has been determined beforehand, said received second type remote-control signal being re-transmitted by said target node to said target terminal, said target terminal being connected with said target node, through at least one predetermined link which is a same type of link as a link existing between said at least one second remote control device and said target terminal, the target node emulating at least one function of said at least one second remote control device so that it can retransmit said received second type remote-control signal; and rejection of said received remote-control signal if the received remote-control signal is one of the second type remote-control signals, and no target node has been determined beforehand.

45. A method for the processing of remote-control signals within a home audiovisual network comprising at least one target node connected to at least one target terminal through at least one predetermined link, and at least one local node connected to said target node, wherein said local node, when receiving a remote-control signal from a remote control device, performs the following steps:

the local node analyzes the remote-control signal to determine whether or not it is specific to the local node; and if the remote-control signal is not specific to the local node and if the target node has been determined beforehand:

the local node sends said remote-control signal to the target node; and the target node retransmits said remote-control signal to the target terminal through the at least one predetermined link which is a same link as a link existing between said remote control device and said target terminal, the target node emulating at least one function of said remote control device so that it can retransmit the received remote control signal.

46. A system for the processing of remote control signals within a home audiovisual network comprising at least one target node connected to at least one target terminal through at least one predetermined link, and at least one node, called a local node, connected to said target node, wherein the system comprises:

a receiver to receive at least one remote-control signal from a remote control device;

a first controller to analyze said remote-control signal received by the receiver and for determining whether or not it is specific to the local node;

a transmitter to transmit said remote-control signal to the target node, said transmitter being activated if the remote-control signal is not specific to the local node and if the target node, to which said target terminal is connected, has been determined beforehand; and a second controller to activate the transparent transmission of said remote-control signal from the target node to the target terminal through the at least one predetermined link which is a same type of link as a link existing between said remote control device and said target terminal, the target node emulating at least one function of said at least one remote control device so that it can retransmit the received remote control signal.

* * * * *